(12) United States Patent
Takebe et al.

(10) Patent No.: US 8,580,358 B2
(45) Date of Patent: Nov. 12, 2013

(54) CELLULOSE ESTER FILM, POLARIZING PLATE FOR IN-PLANE-SWITCHING MODE DISPLAY AND IN-PLANE-SWITCHING MODE DISPLAY USING THE CELLULOSE ESTER FILM

(75) Inventors: Takashi Takebe, Kawasaki (JP); Kunio Shimizu, Otsuki (JP); Koji Tasaka, Hino (JP); Shigeki Oka, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 1080 days.

(21) Appl. No.: 11/473,750

(22) Filed: Jun. 23, 2006

(65) Prior Publication Data

US 2007/0048462 A1    Mar. 1, 2007

(30) Foreign Application Priority Data

Jun. 29, 2005    (JP) ................................ 2005-189682

(51) Int. Cl.
*G02F 1/1335*    (2006.01)

(52) U.S. Cl.
USPC ........................... 428/1.33; 106/139.3; 349/96

(58) Field of Classification Search
USPC .................... 428/1.31, 1.33, 1.54; 106/139.3; 349/96, 122
See application file for complete search history.

(56) References Cited

U.S. PATENT DOCUMENTS

| | | | | |
|---|---|---|---|---|
| 2,689,799 | A * | 9/1954 | Albus et al. | 106/169.39 |
| 3,054,673 | A * | 9/1962 | Bostwick | 430/531 |
| 7,252,865 | B2 * | 8/2007 | Schunk et al. | 428/1.3 |
| 7,504,139 | B2 * | 3/2009 | Kawanishi et al. | 428/1.54 |
| 2001/0048498 | A1 * | 12/2001 | Tomioka et al. | 349/123 |
| 2003/0020208 | A1 * | 1/2003 | Tasaka et al. | 264/217 |
| 2003/0037703 | A1 * | 2/2003 | Saito | 106/169.33 |

FOREIGN PATENT DOCUMENTS

| | | |
|---|---|---|
| JP | 04-229828 | 8/1992 |
| JP | 04-258923 | 9/1992 |
| JP | 05-341124 | 12/1993 |
| JP | 06-075116 | 3/1994 |
| JP | 06-167611 | 6/1994 |
| JP | 06-174920 | 6/1994 |
| JP | 06-222213 | 8/1994 |
| JP | 2002-022956 | 1/2002 |
| JP | 2002-120244 | 4/2002 |
| JP | 2003-012859 | 1/2003 |

OTHER PUBLICATIONS

JPO Website Machine English Translation of JP 2003-012859, Shimizu, Jan. 15, 2003.*
Wikipedia, Azelaic Acid, Wikimedia Foundation, May 20, 2009.*
Wikipedia, Nonanoic Acid, Wikimedia Foundation, Apr. 19, 2009.*
JPO Website Machine English Translation of JP 2004-271846, Kameyama et al. Sep. 30, 2004.*
JPO Website Machine English Translation of JP 2005-154764, Sasada Yasuyuki, Jun. 16, 2005.*
JPO Website Machine English Translation of JP 2001-151901, Takada et al., Jun. 5, 2001.*

* cited by examiner

*Primary Examiner* — Sophie Hon
(74) *Attorney, Agent, or Firm* — Holtz Holtz Goodman & Chick, PC

(57) ABSTRACT

A cellulose ester film containing a polyester represented by Formula (1) or (2), wherein an in-plane retardation value (Ro) is 0 to 5 nm and a retardation value in a thickness direction (Rt) is −20 to 10 nm, Ro and Rt being measured at 23° C. and 55% RH:

$$B_1\text{-}(G\text{-}A\text{-})_m G\text{-}B_1 \qquad \text{Formula (1)}$$

wherein $B_1$: monocarboxylic acid, G: dihydric alcohol, A: dibasic acid, $B_1$, G and A contain no aromatic ring, m: repeat number, plural $B_1$ may be the same or different, and plural G may be the same or different; and $$B_2\text{-}(A\text{-}G\text{-})_n A\text{-}B_2 \qquad \text{Formula (2)}$$

wherein $B_2$: monoalcohol, G: dihydric alcohol, A: dibasic acid, provided that none of $B_2$, G and A contains an aromatic ring, n: repeat number, plural $B_2$ may be the same or different, and plural G may be the same or different.

8 Claims, No Drawings

CELLULOSE ESTER FILM, POLARIZING PLATE FOR IN-PLANE-SWITCHING MODE DISPLAY AND IN-PLANE-SWITCHING MODE DISPLAY USING THE CELLULOSE ESTER FILM

This application is based on Japanese Patent Application No. 2005-189682 filed on Jun. 29, 2005, in Japanese Patent Office, the entire content of which is hereby incorporated by reference.

FIELD OF THE INVENTION

The present invention relates to a cellulose ester film, a polarizing plate for In-Plane-Switching mode display and an In-Plane-Switching mode display using the cellulose ester film.

BACKGROUND OF THE INVENTION

Recently, liquid crystal displays, plasma displays and organic EL displays to be used for personal computers, word processors, watches and desk-top calculators tend to be used in sever conditions. Therefore, high durability is required to an optical film such as a polarizing plate protective film, a retardation film, a front filter for plasma display panel and a front film for organic EL display so that the properties thereof is not deteriorated so that, for example, the physical properties are not degraded and the dimensional stability is maintained, in the sever environment.

Besides, a problem of narrow viewing angle has been posed hitherto about the liquid crystal display. Therefore, use of various kinds of retardation film has been proposed for expanding the viewing angle; cf. Patent Documents 1 to 5, for example. It is well known that a cellulose ester having a lower substitution degree exhibits a larger Rt (retardation in the thickness direction of a film) value (refer to Patent Document 6), however, in an in-plane switching mode liquid crystal display, desired is a cellulose ester film having a lower Rt value, in order to enlarge a viewing angle.

The retardation film strongly influences on the displaying properties such as the viewing angle, color tone and the gradation of the display. Accordingly, high dimensional stability during a long time use and high stability in the retardation are desired to the retardation film. Moreover, high dimensional stability of the polarizing plate using the retardation film, particularly the dimensional stability in the absorption axis direction of the polarizers and superior resistivity against degradation of the polarizing plate, are desired. The cellulose ester film disclosed in Patent Document 7, being added with a polyester, exhibits a superior dimensional stability, however, durability of polarizing plate is poor. The cellulose ester film disclosed in Patent Document 8, being added with an acryl polymer, exhibits a lowered Rt value, however, notable deterioration of the polarizing plate after a long time use has been observed. In order to prevent deterioration of a polarizing plate, generally known is to add a material containing an aromatic ring, however, addition of an aromatic ring results in a problem in that Rt value is increased.

When the dimensional variation during the aging for a long time is large, stress is generated between the polarizing plate and the adhesive or between the polarizing plate and the liquid crystal cell pasted on the polarizing plate through an adhesive layer, and a phenomenon so-called corner unevenness which is a white defect in a black image is caused (refer to Patent Documents 9 and 10).

It is desirable that the retardation film not only has a function of optical compensation for the liquid crystal cell but also is superior as the protective film with respect to the durability of the flatness against an environmental change.

Patent Document 1: Japanese Patent Publication Open to Public Inspection (hereafter referred to as JP-A) No. 4-229828
Patent Document 2: JP-A No. 4-258923
Patent Document 3: JP-A No. 6-75116
Patent Document 4: JP-A No. 6-174920
Patent Document 5: JP-A No. 6-222213
Patent Document 6: JP-A No. 2002-120244
Patent Document 7: JP-A No. 2002-22956
Patent Document 8: JP-A No. 2003-12859
Patent Document 9: JP-A No. 5-341124
Patent Document 10: JP-A No. 6-167611

SUMMARY OF THE INVENTION

The present invention has been made in view of the above mentioned problems. An object of the present invention is to provide a cellulose ester film exhibiting excellent dimensional stability, anti-corner unevenness (light leaking) property, flatness, and stability of retardation against a humidity variation; a polarizing plate which enables excellent viewing angle stability using the cellulose ester film; and an In-Plane-Switching mode display such as an IPS mode and a FFS mode.

One of the aspects of the present invention to achieve the above abject is a cellulose ester film containing a polyester represented by Formula (1) or a polyester represented by Formula (2), wherein an in-plane retardation value of the cellulose ester film (Ro) is 0 to 5 nm and a retardation value in a thickness direction of the cellulose ester film (Rt) is −20 to 10 nm, Ro and Rt being measured under a condition of 23° C. and 55% RH:

$$B_1\text{-}(G\text{-}A\text{-})_m G\text{-}B_1 \qquad \text{Formula (1)}$$

wherein $B_1$ represents a monocarboxylic acid, G represents a dihydric alcohol, A represents a dibasic acid, provided that none of $B_1$, G and A contains an aromatic ring, m represents a repeat number, a plurality of $B_1$ may be the same or different, and a plurality of G may be the same or different; and

$$B_2\text{-}(A\text{-}G\text{-})_n A\text{-}B_2 \qquad \text{Formula (2)}$$

wherein $B_2$ represents a monoalcohol, G represents a dihydric alcohol, A represents a dibasic acid, provided that none of $B_2$, G and A contains an aromatic ring, n represents a repeat number, a plurality of $B_2$ may be the same or different, and a plurality of G may be the same or different.

DESCRIPTION OF THE PREFERRED EMBODIMENTS

The above object of the present invention is attained by the following structures.

(1) A cellulose ester film comprising a polyester represented by Formula (1) or a polyester represented by Formula (2), wherein an in-plane retardation value of the cellulose ester film (Ro) is 0 to 5 nm and a retardation value in a thickness direction of the cellulose ester film (Rt) is −20 to 10 nm, Ro and Rt being measured under a condition of 23° C. and 55% RH:

$$B_1\text{-}(G\text{-}A\text{-})_m G\text{-}B_1 \qquad \text{Formula (1)}$$

wherein $B_1$ represents a monocarboxylic acid, G represents a dihydric alcohol, A represents a dibasic acid, provided that none of $B_1$, G and A contains an aromatic ring, m represents a repeat number, a plurality of $B_1$ may be the same or different, and a plurality of G may be the same or different; and

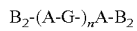

$$B_2\text{-}(A\text{-}G\text{-})_n A\text{-}B_2 \quad \text{Formula (2)}$$

wherein $B_2$ represents a monoalcohol, G represents a dihydric alcohol, A represents a dibasic acid, provided that none of $B_2$, G and A contains an aromatic ring, n represents a repeat number, a plurality of $B_2$ may be the same or different, and a plurality of G may be the same or different.

(2) The cellulose ester film of Item (1), wherein in Formula (1), $B_1$ represents a monocarboxylic acid having 1 to 12 carbon atoms, G represents a dihydric alcohol having 2 to 12 carbon atoms, and A represents a dibasic acid having 2 to 12 carbon atoms;

in Formula (2), $B_2$ represents a monoalcohol having 1 to 12 carbon atoms, G represents a dihydric alcohol having 2 to 12 carbon atoms, A represents a dibasic acid having 2 to 12 carbon atoms;

a weight content of the polyester represented by Formula (1) or of the polyester represented by Formula (2) is 2 to 30 weight % based on a weight of the cellulose ester; and a weight average molecular weight (Mw) of the polyester represented by Formula (1) or of the polyester represented by Formula (2) is not more than 20000.

(3) The cellulose ester film of Item (2), wherein the weight average molecular weight (Mw) of the polyester is not more than 10000.

(4) The cellulose ester film of any one of Items (1) to (3), wherein the cellulose ester film comprises an acyl group having 2 to 4 carbon atoms as a substituent; and the cellulose ester film meets the following conditions:

$$1.8 \leq SA \leq 2.6$$

$$0.1 \leq SP \leq 1.2$$

wherein SA represents an acetyl substitution degree and SP represents a propionyl substitution degree.

(5) The cellulose ester film of any one of Items (1) to (4), wherein the cellulose ester film comprises an acryl polymer.

(6) The cellulose ester film of Item (5), wherein the acryl polymer comprises X and Y, X representing a monomer unit having a hydrophilic group and Y representing a monomer unit having no hydrophilic group;

a molar ratio of X:Y is 1:1 to 1:99; and a weight content of the acryl polymer is 1 to 20 weight % base on a weight of a cellulose ester of the cellulose ester film.

(7) The cellulose ester film of any one of Items (1) to (6), wherein a thickness of the cellulose ester film is 20 to 60 μm.

(8) A polarizing plate for an in-plane switching mode display, the polarizing plate comprising the cellulose ester film of any one of Items (1) to (7).

(9) The polarizing plate of Item (8), wherein the polarizing plate comprises a polarizer containing an ethylenically modified polyvinyl alcohol; and a thickness of the polarizer is 5 to 20 μm.

(10) An in-plane switching mode display employing the polarizing plate of Item (8) or (9).

A cellulose ester film excellent in the dimensional stability, anti-corner unevenness (light leaking) property, flatness, and in the stability of retardation relating to humidity variation, a polarizing plate having high viewing angle stability using the film, and an In-Plane-Switching type display such as IPS and FFS can be provided by the present invention.

As a result of investigation by the inventors it was found that the cellulose ester film excellent in the dimensional stability, anti-corner unevenness (light leaking) property, flatness, and in the stability of retardation relating to humidity variation can be obtained by the cellulose ester film containing a polyester represented by Formula (1) or (2), which has an in plane retardation Ro of from 0 to 5 nm at an ordinary temperature and humidity (25° C., 55% RH), a retardation in the thickness direction Rt of from −20 to 10 nm, or the cellulose ester film containing a polyester represented by Formula (3) or (4), which has a content of the polyester from 2 to 30% by weight, a weight average molecular weight of not more than 10,000, a retardation in plan Ro of from 0 to 5 nm at an ordinary temperature and humidity (25° C., 55% RH), and a retardation in the thickness direction Rt from −20 to 10 nm.

The present invention is described in detail below.

[Polyester]

(Polyester Represented by Formula (1) or (2))

One of the characteristics of the cellulose ester film of the present invention is to contain the polyester represented by Formula (1) or (2).

In Formulas (1) and (2), $B_1$ is a monocarboxylic acid component, $B_2$ is a monoalcohol component, G is a dihydric alcohol component and A is a dibasic acid component; the polyester is synthesized by these components. The components $B_1$, $B_2$, G and A are each characterized in that these components contain no aromatic ring, and m and n each represents a repeat number.

As the carboxylic acid represented by $B_1$, a known aliphatic or alicyclic monocarboxylic acid can be used without any limitation.

Though the followings can be described as examples of preferable monocarboxylic acid, the present invention is not limited thereto.

As the aliphatic monocarboxylic acid, an aliphatic acid having a straight chain or a branched chain each containing from 1 to 32 carbon atoms is preferably applied. The number of the carbon atoms is preferably from 1 to 20 and more preferably from 1 to 12. The inclusion of acetic acid is preferable because the compatibility with the cellulose ester is increased and mixing of acetic acid and another monocarboxylic acid is also preferable.

Examples of preferable monocarboxylic acid include a saturated aliphatic acid such as formic acid, acetic acid, propionic acid, butyric acid, valeric acid, capronic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachinic acid, behenic acid, lignocelic acid, cerotic acid, heptaconic acid, montanic acid, melicic acid and laccelic acid, and a unsaturated aliphatic acid such as undecylenic acid, oleic acid, sorbic acid, linolic acid, linolenic acid and arachidonic acid.

As the alcohol component represented by $B_2$, a known alcohol can be applied without any limitation. For example, a saturated or unsaturated aliphatic alcohol having a straight or branched chain containing from 1 to 32 carbon atoms can be applied. The number of the carbon atoms is preferably from 1 to 20 and more preferably from 1 to 12.

As the dihydric alcohol represented by G, the followings can be cited but the present invention is not limited to them. Examples of the dihydric alcohol include ethylene glycol, diethylene glycol, 1,2-propylene glycol, 1,3-propylene glycol, 1,2-butylene glycol, 1,3-butylene glycol, 1,4-butylene glycol, 1,5-pentanediol, 1,6 hexanediol, 1,5-pentylene glycol, triethylene glycol and tetraethylene glycol. Among them, ethylene glycol, 1,2-propylene glycol, 1,3-propylene glycol, 1,2-butylene glycol, 1,3-butylene glycol, 1,4-butylene glycol, 1,4-hexanediol, diethylene glycol and triethylene glycol are preferable, and 3-propylene glycol, 1,4-butylene glycol, 1,6-hexanediol and diethylene glycol are further preferably applied.

As the dibasic acid (dicarboxylic acid) represented by A, aliphatic and alicyclic dibasic acids such as malonic acid, succinic acid, glutaric acid, adipic acid, pimelic acid, suberic acid, azelaic acid, sebacic acid, undecanedicarboxylic acid and dodecanedicarboxylic acid are preferably applicable. Particularly, at least one selected from ones having from 4 to 12 carbon atoms is used. Two or more kinds of the carboxylic acid may be used in combination.

m and n each represent a repeat number which is preferably from 1 to 170.

(Polyester Represented by Formulas (3) or (4))

One of the characteristics of the cellulose ester film of the present invention is to contain the polyester represented by Formulas (3) or (4).

In Formulas (3) and (4), $B_1$ is a monocrboxylic acid component, $B_2$ is a monoalcohol component, G is a dihydric alcohol component having from 2 to 12 carbon atoms, and the polyester is synthesized from them. $B_1$, G and A each contains no aromatic ring, and m and n each represent a repeating number.

$B_1$ and $B_2$ are respectively the same as $B_1$ and $B_2$ defined by Formula (1) and (2), respectively.

G and A are each the alcohol component and the dibasic acid each having from 2 to 12 carbon atoms the same as G and A in Formula (1) or (2), respectively.

The weight average molecular weight of the polyester is preferably not more than 20,000 and more preferably not more than 10,000. The polyester having a weight average molecular weight of from 500 to 10,000 shows good compatibility with the cellulose ester and is not evaporated in the film forming process.

The condensation polymerization of the polyester is carried out by an ordinary method. For example, the polyester can be easily synthesized by a method by directive reaction of the dibasic acid with the glycol, a thermally melting condensation method by polyesterization reaction or ester-exchanging reaction of the dibasic acid or its alkyl ester such as methyl ester of the dibasic acid with the glycol, or a method by dehydrohalogenation reaction of a acid chloride of such the acid with the glycol. The polyester having a weight average molecular weight not so large is preferably synthesized by the direct reaction method. The polyester having a molecular weight distribution rising in the low molecular weight side shows very high compatibility with the cellulose ester so that the cellulose ester film having low moisture permeability and high transparency can be obtained. A known method can be applied without any limitation for controlling the molecular weight. For example, the molecular weight can be controlled under a suitable reacting condition by controlling the adding amount of a mono-valent acid or alcohol in a method for blocking the terminal of the molecular by the mono-valent acid or the mono-valent alcohol. In such the case, the use of the mono-valent acid is preferable from the viewpoint of the stability of the polymer. For the acid, ones which are difficulty distillated out from the system during the polymerization-condensation reaction and easily distillated out after the reaction such as acetic acid, propionic acid and butyric acid are selected. These acids may be used in a mixed state. In the case of the direct reaction, the molecular weight can be controlled by stopping the reaction suitable timing according to the amount of water distillated out from the system during the reaction. Moreover, the control can be carried out by biasing the charging mole number of the glycol or the dibasic acid or by controlling the reaction temperature.

The polyester relating to the present invention is preferably contained in the cellulose ester in a ratio of from 1 to 40% by weight, and the polyester represented by Formula (3) or (4) is preferably contained in a ratio of from 2 to 30%, particularly fro 5 to 15%, by weight.

A low retardation (Ro and Rt) film can be obtained by the addition of the polyester and a polarizing plate which is low in the degradation by high temperature and high humidity can be obtained by the use of such the film. An In-Plane-Switching type display which maintains high contrast and wide viewing angle for a long time and has superior flatness can be obtained by the use of such the polarizing plate.

It is preferable that the cellulose ester film of the present invention further contains an acryl type polymer.

A polarizing plate considerably improved in the degradation of the polarizer at high temperature and high moisture can be obtained by the use of the film containing the acryl type polymer. In the display using such the polarizing plate, the high contract is kept for further long time and the corner unevenness is not caused because the dimensional variation under sever conditions is little.

In the present invention, the acryl type polymer is a polymer or a copolymer synthesized from a monomer such as acrylic acid or acrylate having no aromatic ring in the molecular thereof.

Examples of the acrylate monomer having no aromatic ring include methyl acrylate, ethyl acrylate, i- or n-propyl acrylate, n-, i-, s- or t-butyl acrylate, n-, i- or s-pentyl acrylate, n- or i-hexyl acrylate, n- or i-heptyl acrylate, n- or i-octyl acrylate, n- or i-nonyl acrylate, n- or i-myristyl acrylate, 2-ethylhexyl acrylate, ε-caprolactone acrylate, 2-hydroxyethyl acrylate, 2-hydroxypropyl acrylate, 3-hydroxypropyl acrylate, 4-hydroxybutyl acrylate, 2-hydroxybutyl acrylate, 2-methoxyethyl acrylate and 2-ethoxyethyl acrylate, and the above-mentioned in each of which the acrylate is replaced by methacrylate.

In the case of that the acryl type polymer is a copolymer, it is preferable that the copolymer composed of a monomer component X having a hydrophilic group and a monomer component Y having no hydrophilic group and a mole ratio of X:Y is from 1:1 to 1:99. Without this range, the degradation of the polarizer is considerably increased when the film is used in the polarizing plate. The content of the acryl polymer is preferably from 1 to 20% by weight of the cellulose ester.

The acryl type polymer having a weight average molecular weight of from 500 to 10,000 displays good compatibility with the cellulose ester and is not volatiled during the film formation. An acryl type polymer having an acryl type polymer as a side chain is gives excellent transparency and extremely low moisture permeability to the cellulose ester film when the molecular weight of such the polymer is from 500 to 5,000. The film shows superior properties for the polarizing plate protective film.

The above acryl type polymer can be synthesized referring the method described in JP-A No. 2003-12859.

(Weight Average Molecular Weight)

In the present invention, the weight average molecular weight Mw of the polyester and the acryl type polymer can be measured an ordinary using gel permeation chromatographic GPC) method. In concrete, the measurement was carried out by using a column of Shodex-K806-K803, manufactured by Showa Denko Co., Ltd., at 25° C., an eluate of methylene chloride, a detector of R1 and a referring sample of polystyrene. The injection amount of sample was 100 µl and the sample concentration was 0.1 weight/volume percent.

(Thin Layer Formation)

The thickness of the cellulose ester film of the present invention may be from 10 to 200 µm, and preferably from 20 to 60 µm. The variation of the retardation accompanied with the variation of the environmental condition such as temperature is largely inhibited by making the thickness so thin. The In-Plane-Switching type display capable of maintaining the high contrast and wide viewing angle under the sever conditions can be obtained by the use of such the cellulose ester film.

(Cellulose Ester)

The cellulose ester to be used in the present invention is a carboxylic acid ester having from 2 to 22 carbon atoms, and preferably a lower fatty acid ester having not more than 6 carbon atoms. For example, cellulose acetate, cellulose propionate, cellulose butyrate, cellulose acetate phthalate, and a mixed fatty acid ester such as cellulose acetate-propionate and cellulose acetate-butyrate described in JP-A Nos. 10-45804 and 8-231761, and U.S. Pat. No. 2,319,052 are usable. Among the above-mentioned, preferable lower fatty acid ester of cellulose are cellulose triacetate and cellulose acetate-propionate. These cellulose esters can be used in a mixed state.

In the case of the cellulose triacetate, one having a total acylation degree (acetylation degree) of preferably 2.7 to 3.0 and more preferably 2.8 to 3.0 is used.

The preferable cellulose ester other than the cellulose triacetate is ones having an acyl group containing from 2 to 4 carbon atoms as a substituent and satisfying the following expressions I and II wherein SA is the acetylation degree and SP is the propionyl substitution degree.

$$2.8 \leq SA + SP \leq 3.0 \qquad \text{Expression I}$$

$$0 \leq SA \leq 3.0 \qquad \text{Expression II}$$

Examples of a preferable cellulose ester include: (SA=0.46, SP=2.52), (SA=1.9, SP=1.0) and (SA=1.9, SP=1.08). Of these, more preferable is an cellulose acetate propionate satisfying $1.8 \leq SA \leq 2.6$ and $0.1 \leq SP \leq 1.2$ (Total acylation degree=SA+SP) is preferred. The site not substituted by an acyl group is usually occupied by a hydroxyl group. Such the cellulose ester can be synthesized by a known method.

The acylation degree can be determined according to the method of ASTM-D871-96.

The number average molecular weight (Mn) of the cellulose ester to be used in the present invention is preferably from 60,000 to 200,000, more preferably from 100,000 to 200,000, and specifically preferably from 150,000 to 200,000.

A ratio Mw/Mn of the weight average molecular weight Mw to the number average molecular weight Mn is preferably from 1.4 to 3.0 and more preferably from 1.7 to 2.2.

The average molecular weight and the molecular weight distribution of the cellulose ester can be measured by a known method using high speed liquid chromatography. The number average molecular weight, the weight average molecular weight and the ratio of Mw/Mn can be calculated from the measured results.

The measuring conditions are as follows.

Solvent: Methylene chloride

Column: Connected columns of Shodex K806, K805 and K803, manufactured by Show Denko Co., Ltd.

Column temperature: 25° C.

Sample concentration: 0.1% by weight

Detector: R1 Model 503, manufactured by GL Science Co., Ltd.

Pump: L6000, manufactured by Hitachi Seisakusho Co., Ltd.

Flowing rate: 1.0 ml/minute

Calibration curve: A calibration curve was used which was prepared by using 13 standard polyethylene samples having Mw of from 1,000,000 to 500, STK Standard Polystyrene manufactured by Toso Co., Ltd. It is preferable that the molecular weight of the every thirteen standard samples is each about equally different from each other in the molecular weight.

Cellulose esters synthesized from cotton linter, wood pulp or kenaf can be used singly or in combination. Particularly, the singly or combination use of the cellulose ester synthesized from the cotton linter, hereinafter simply referred to as linter sometimes, or the wood pulp is preferred.

The cellulose esters prepared from them can be used in a mixed state in an optional ratio. These cellulose esters can be obtained by an ordinal method using a protonic catalyst such as sulfuric acid, an organic acid such as acetic acid and an organic solvent such as methylene chloride when an acid anhydride such as acetic anhydride, propionic anhydride and butyric anhydride is used as the acylating agent.

In the case of the acetyl cellulose, the time for acetylation should be prolonged for rising the acetylation degree. However, excessively long time for the acetylation causes simultaneously progress of decomposition and brings undesirable results caused by scission of the polymer chain and the decomposition of acetyl group. It is necessary, therefore, to set the reaction time within a certain range for raising the acetylation degree and inhibiting the decomposition within desired degree. It is unsuitable to control the reaction only by the reaction time because various conditions are applied and the reaction is largely varied depending on the conditions such as the reaction apparatus and equipment. The molecular weight distribution is expanded accompanied with the progression of decomposition of the polymer. Accordingly, the degree of the decomposition can be decided by the usually used value of the ratio of weight average molecular weight Mw to number average molecular weight Mn also in the case of the cellulose ester. Namely, the ratio of Mw/Mn can be used as an indicator of the reaction degree for carrying out acetylation reaction for sufficient time without causing excessively decomposition by the reaction for too long time.

An example of the production method for the cellulose ester is described below. One hundred parts by weight of cotton linter as the raw cellulose material was crushed and 40 parts by weight of acetic acid was added and subjected to a pre-activation treatment at 36° C. for 20 minutes. After that, 8 parts by weight of sulfuric acid, 260 parts by weight of acetic anhydride and 350 parts by weight of acetic acid were added to the above cotton linter and then acetylation was carried out at 36° C. for 120 minutes. The reaction system was neutralized by 11 parts by weight of 24% aqueous solution of magnesium acetate and saponified and ripened at 63° C. for 35 minutes to obtain acetyl cellulose. The acetyl cellulose was stirred at room temperature for 160 minutes using 10 times of an aqueous solution of acetic acid (acetic acid:water=1:1 in weight ratio) and then filtered and dried. Thus purified acetyl cellulose having an acetylation ratio of 2.75 was obtained. The acetyl cellulose had a Mn of 92,000, Mw of 156,000 and Mw/Mn of 1.7. Acetyl celluloses each having various acetylation degrees and Mw/Mn ratios can be synthesized by varying the acetylation conditions such as temperature, time and stirring and that of the hydrolysis.

The synthesized cellulose ester is preferably subjected to purification for removing low molecular weight component and to filtration for removing un-acetylated and low-acetylated components.

The mixed acid cellulose ester can be obtained by the method described in JP-A No. 10-45804. The acylation degree can be measured according to the method prescribed in ASTM-D817-9.

The cellulose ester is influenced by very small quality of metal component contained therein. It is supposed that the presence of the metal component is related to the water used in the production process of the cellulose ester. The component capable of forming an insoluble nucleus is preferably small in the amount. The amount of a metal ion such as iron, calcium and magnesium is preferably small because such the ion sometimes forms an insoluble substance by foaming a slat with a polymer decomposition product having a possibility of containing an organic acid group. The content of the iron (Fe) component is preferably not more than 1 ppm. The component of calcium (Ca) is much contained in ground water and river water, and water having a high content of the calcium ion becomes hard water, which is unsuitable for drinking water. The calcium component tends to form a coordination compound or a complex with an acidic component such as carboxylic acid or sulfonic acid or many kinds of ligand and causes scum (precipitation and turbid of insoluble compound) derived from the insoluble calcium compound.

The amount of the calcium (ca) component is not more than 60 ppm, and preferably from 0 to 30 ppm. The amount of the magnesium (Mg) component is preferably from 0 to 70 ppm, and particularly preferably from 0 to 20 ppm, because the excessive presence of the magnesium component forms an insoluble substance. The amount of the metal components such as iron (Fe), calcium (Ca) and magnesium (Mg) can be measured by inductively coupled plasma-atomic emission spectrometry (ICP-AES) after a pretreatment in which an absolutely dried cellulose ester sample is subjected to decomposition by a micro-digesting wet decomposition apparatus (decomposition by sulfuric acid and nitric acid) and alkali fusion.

(Plasticizer)

A plasticizer can be further added to the cellulose ester of the present invention.

Examples of the plasticizer which can be added to the cellulose ester of the present invention include a phosphate type plasticizer, a phthalate type plasticizer, a trimellitate type plasticizer, a pyromellitate type plasticizer, a glycolate type plasticizer, a citrate type plasticizer, a polyalcohol ester type plasticizer and a poly-valent carboxylate ester type plasticizer, though the plasticizer is not specifically limited. At least one plasticizer selected from the polyalcohol ester type plasticizers and the citrate type plasticizers can be preferably added.

The polyalcohol ester type plasticizer is a plasticizer composed of an ester of an aliphatic polyalcohol with a monocarboxylic acid. An ester of an aliphatic polyalcohol having from 2 to 20 carbon atoms is preferred.

The polyalcohol to be used in the present invention is represented by the following Formula (3).

    Formula (3)

In the above formula, $R_1$ is an n-valent organic group and n is an integer of not less than 2, OH is an alcoholic and/or a phenolic hydroxyl group.

Examples of preferable a polyalcohol include: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-bunanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol, but the present invention is not limited to them. Specifically preferable are triethylene glycol, tetraethylene glycol, dipropylene glycol, tripropylene glycol, sorbitol, triethylol propane and xylitol.

As the monocarboxylic acid to be used in the polyalcohol ester, specifically preferable is an aliphatic monocarboxylic acid.

Examples of the preferable monocarboxylic acid are listed below but the present invention is not limited thereto.

As an aliphatic monocarboxylic acid, a straight or branched chain carboxylic acid having 1 to 32 carbon atoms is preferably employed. The number of carbon atoms is more preferably from 1 to 20, and specifically preferably from 1 to 12. The addition of acetic acid is preferable for raising the compatibility with the cellulose derivative, and the mixing of acetic acid with another carboxylic acid is also preferable.

As the preferable aliphatic monocarboxylic acid, a saturated fatty acid such as formic acid, acetic acid, propionic acid, butyric acid, valeric acid, caproic acid, enantic acid, caprylic acid, pelargonic acid, capric acid, 2-ethyl-hexane carboxylic acid, undecylic acid, lauric acid, dodecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid and lacceric acid, and a unsaturated fatty acid such as undecylenic acid, oleic acid, sorbic acid, linolic acid, linolenic acid and arachidonic acid can be exemplified.

The molecular weight of the polyalcohol is preferably from 300 to 1,500, and more preferably from 350 to 750 though the molecular weight is not specifically limited. Larger molecular weight is preferable for low volatility and smaller molecular weight is preferable for reducing the moisture permeability and for increasing the compatibility with the cellulose derivative.

The carboxylic acid to be employed in the polyalcohol ester may be one kind or a mixture of two or more kinds of them. The hydroxyl group in the polyalcohol may be entirely esterified or may be partially left unesterified.

Concrete compounds of the polyalcohol ester are listed below.

1

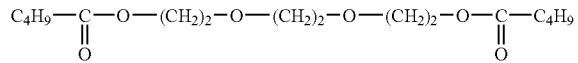

-continued
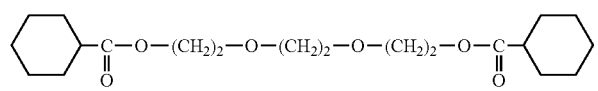
3
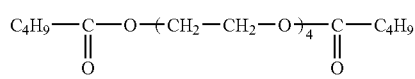
5
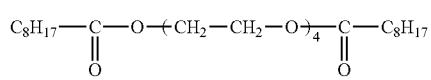
6
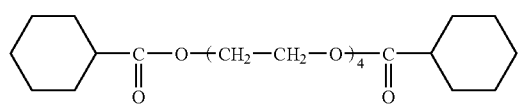
7
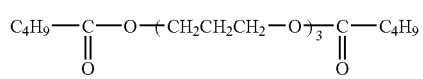
9
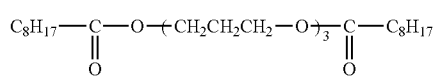
10
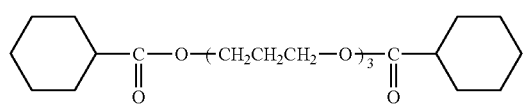
11
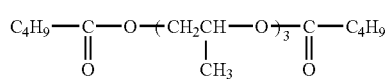
13
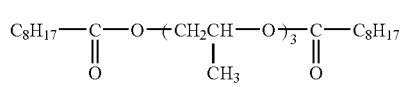
14
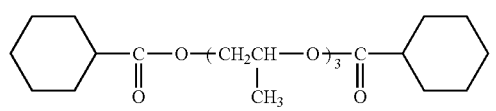
15
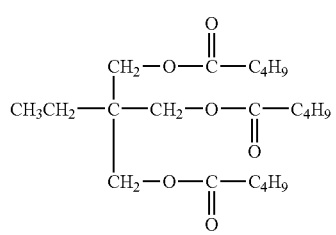
17
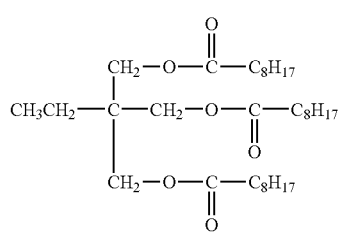
18

21
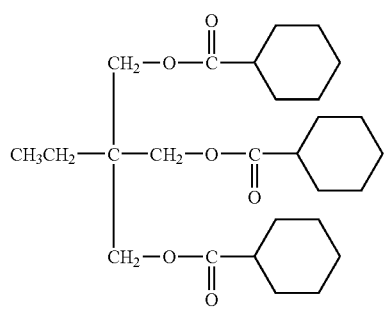
22
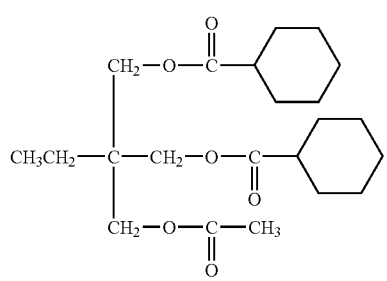
23
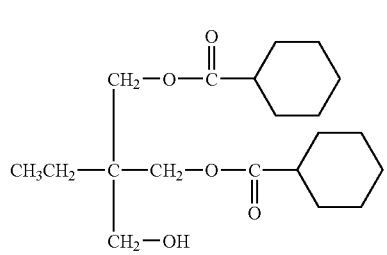
25
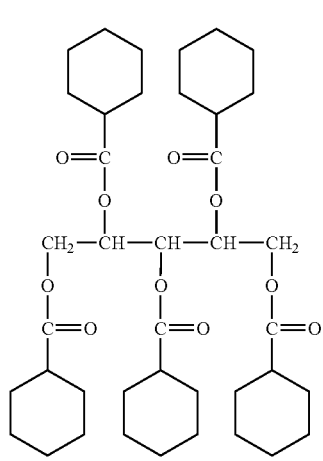
28
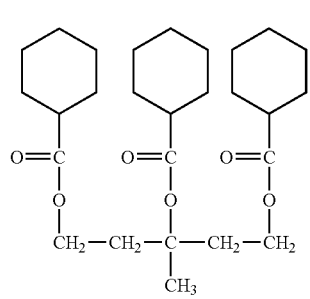

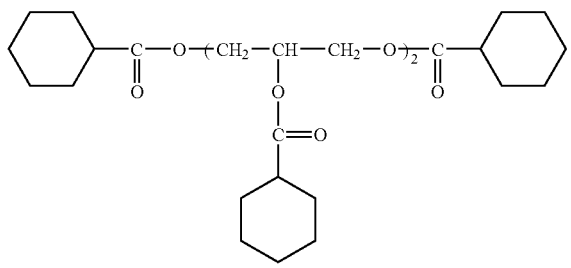

Examples of a citrate plasticizer include: acetyltrimethyl citrate, acetyltriethyl citrate and acetyltributyl citrate, although the citrate plasticizer is not specifically limited.

The weight content of a citrate is preferably 1-30 weight % and more preferably 2-20 weight % based on the weight of the film.

As for other plasticizers, alkylphthalylalkyl glycolates are preferably used. Examples of an alkylphthalylalkyl glycolate include: methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

Examples of a phthalate plasticizer include: diethyl phthalate, dimethoxyethyl phthalate, dimethyl phthalate, dioctyl phthalate, dibutyl phthalate, di-2-ethylhexyl phthalate and dioctyl phthalate.

Examples of a fatty acid ester plasticizer include: butyl oleate, methylacetyl ricinoleate and dibutyl sebacate.

Examples of a phosphate plasticizer include: triphenyl phosphate, tricresyl phosphate, cresyl diphenyl phosphate, octyl diphenyl phosphate, diphenyl biphenyl phosphate, trioctyl phosphate and tributyl phosphate.

(UV Absorbing Agent)

The cellulose ester film of the present invention may contain a UV absorbing agent. The UV absorbing agent preferably exhibits a high absorbing ability for UV rays having a wavelength of 370 nm or less, and a low absorbing ability for visible rays having a wavelength of 400 nm or more in view of exhibiting an excellent visibility of a liquid crystal display.

Specific examples of a preferable UV absorbing agent used in the present invention include: oxybenzophenone, benzotriazol, salicylic acid ester, benzophenone, cyanoacrylate, triazine and a nickel complex salt.

Concrete examples of a UV absorbing agent useful in the present invention are listed below, however the present invention is not limited thereto.

UV-1: 2-(2'-hydroxy-5'-methylphenyl)benzotriazole
UV-2: 2-(2'-hydroxy-3',5'-di-tert-butylphenyl)benzotriazole
UV-3: 2-(2'-hydroxy-3'-tert-butyl-5'-methylphenyl)benzotriazole
UV-4: 2-(2'-hydroxy-3',5'-di-tert-butylphenyl)-5-chloro benzotriazole
UV-5: 2-(2'-hydroxy-3'-(3",4",5",6"-tetrahydro phthalimidomethyl)-5'-methylphenyl)benzotriazole
UV-6: 2,2-methylenebis (4-(1,1,3,3-tetramethylbutyl)-6-(2H-benzotriazole-2-yl)phenol)
UV-7: 2-(2'-hydroxy-3'-tert-butyl-5'-methylphenyl)-5-chlorobenzotriazole Concrete examples of a benzophenone UV absorbing agent which is one of the useful UV absorbing agents of the present invention are listed below, however the present invention is not limited thereto.

U-8: 2,4-dihydroxy benzophenone
UV-9: 2,2'-dihydroxy-4-methoxy benzophenone
UV-10: 2-hydroxy-4 methoxy-5-sulfo benzophenone
UV-11: bis(2-methoxy-4-hydroxy-5-benzoylphenylmethane Further, a compound having a 1,3,5-triazine ring is also usable as a UV absorbing agent of the cellulose ester film of the present invention.

Of these, a triazine compound disclosed as Formula (I) in JP-A No. 2001-235621 is also preferable to be used in the cellulose ester film of the present invention.

The cellulose ester film of the present invention preferably contains two or more kinds of UV absorbing agents.

As a UV absorbing agent, a polymer UV absorbing agent may also be preferably used, and specifically a polymer type UV absorbing agent disclosed in JP-A No. 6-148430 is preferable.

The addition methods of said UV absorbing agents are as follows. They may be dissolved in organic solvents such as alcohol (e.g., methanol, ethanol or butanol), methylene chloride, methyl acetate, acetone and dioxolane, and the resulting solution of which is added to a dope. Alternatively, they may be added directly to a dope. UV absorbing agents such as inorganic powder, which are not soluble in organic solvents, may be dispersed into a mixture of organic solvents and cellulose ester, employing a dissolver or a sand mill, and then added to a dope.

The employed amount of UV absorbing agents may vary depending on the type of UV absorbing agent or on the use condition, however, the content of a UV absorbing agent is preferably 0.1-4.0% by weight, and more preferably 0.6-2.0% by weight based on the weight of the cellulose ester film.

<Particles>

The cellulose ester film of the present invention preferably contains particles.

As for the particles use in the present invention, examples of inorganic particles include: silicon dioxide particles, titanium dioxide particles, aluminium oxide particles, zirconium oxide particles, calcium carbonate particles, talc particles, clay particles, calcinated caolin particles, calcinated calcium silicate particles, hydration calcium silicate particles, aluminium silicate particles, magnesium silicate particles, and calcium phosphate particles. Particles containing silicon are preferable, because low turbidity of the film is obtained. Silicon dioxide particles are specifically preferable.

The mean diameter of primary particles is preferably from 1 to 200 nm, more preferably 5 to 50 nm, and specifically preferably from 7 to 20 nm. The particle should preferably exist as an aggregated secondary particle of a diameter from 0.05 to 0.3 μm. The content of the particle in a cellulose ester film is preferably from 0.01 to 1% by weight, and is more preferably from 0.1 to 0.5% by weight. In a multi-layered cellulose ester film prepared by a co-casting method, the particles are preferably incorporated in the surface layer.

Particles of silicon dioxide available on the market include, for example: AEROSIL R972, R927V, R974, R812, 200, 200V, 300, R202, OX50 and TT600 which are manufacture by Nippon Aerosil Co., Ltd.

Particles of zirconium oxide available on the market include, for example: AEROSIL R976 and R811 manufacture by Nippon Aerosil Co., Ltd.

Particles of polymer available on the market include, for example: silicone resin, fluorine-contained resin and acryl resin. Among these, silicone resin, especially three dimensionally networked silicone resin is preferably used. Examples of silicone resins include: TOSPERL 103, 105, 108, 120, 145, 3120 and 240, which are manufactured by Toshiba Silicone Co., Ltd.

Among the particles listed above, AEROSIL 200V and AEROSIL R972V are specifically preferable with respect to exhibiting a lower friction coefficient while the low turbidity is maintained.

<Dye>

In order to optimize color of the cellulose ester film, dyes may preferably be added. For example, a blue dye may be added to reduce a yellow hue of the film. Preferable are anthraquinone type dyes.

The anthraquinone type dye may have any of several kinds of substituents in any of the 8 positions of anthraquinone. Examples of preferable substituents include an anilino group, a hydroxyl group, an amino group, a nitro group and a hydrogen atom. Blue dyes disclosed in JP-A 2001-154017, specifically, anthraquinone dyes, are preferably added to the film.

Additives described above may be added to a dope containing cellulose ester via batch mixing, or, alternatively, they may be added via in-line mixing using a dissolving solvent of the additives.

In an in-line mixing process of additive solutions, a smaller amount of cellulose ester is preferably dissolved in the dope in order to obtain a sufficiently mixed dope. The amount of cellulose ester is preferably from 1 to 10 weight parts in 100 weight parts of solvent, and more preferably from 3 to 5 weight parts.

As a mixer for in-line addition and mixing, for example, a static mixer manufactured by Toray Engineering Co., Ltd. or a static type in-line mixer High-Mixer SWJ manufactured by Toray Engineering Co., Ltd., is preferably used.

<Manufacturing Method of Cellulose Ester Film>

The manufacturing method of the cellulose ester film of the present invention will now be explained.

The manufacturing method of the cellulose ester film of the present invention contains the processes of: a dope preparing process in which cellulose ester and an additive, for example, above mentioned plasticizer, are dissolved in a solvent; a casting process in which a dope is cast on an endless metal support inventively running; a drying process in which a cast dope is dried to form a web; a peeling process in which a dried web is peeled from the metal support; a stretching process or a width keeping process; a further drying process; and a winding process of the completed film.

The dope preparation process will now be explained. In the dope preparation process, a higher content of cellulose ester in the dope is preferable since duration of the drying process following the casting process is shortened, however, a too high content may result in loss of filtration accuracy due to an increased filtration load. Preferable content of cellulose ester is from 10-35% by weight and more preferably from 15-25% by weight.

A solvent may be used alone, however, two or more solvents may also be used together. A mixture of a good solvent and a poor solvent is more preferably used to increase manufacturing efficiency. A mixed solvent being rich in a good solvent is preferable to increase solubility of cellulose ester. The preferable mixing ratios are from 60 to 98 percent by weight of a good solvent, and from 2 to 40 percent of a poor solvent. Herein, a good solvent is described as being capable of dissolving cellulose ester with a single use, and a poor solvent as being incapable of dissolving nor swelling cellulose ester alone. Sometimes, a solvent works as a good solvent of a cellulose ester, and sometimes as a poor solvent depending on the average acetylation degree (degree of acetyl substitution) of the cellulose ester. For example, acetone is a good solvent for an acetic ester of cellulose of which the acetylation degree is 2.4, as well as for cellulose acetatepropionate, however, it is a poor solvent for cellulose acetate of which acetylation degree is 2.8.

Example of good solvents used in the present invention include: an organic halide (such as methylene chloride), dioxolane, acetone, methyl acetate and methyl acetoacetate, of these, methylene chloride and methyl acetate are specifically preferable. However, the present invention is not specifically limited thereto.

Examples of poor solvents used in the present invention include: methanol, ethanol, n-butanol, cyclohexane and cyclohexanone, however, the present invention is not specifically limited thereto.

Example of a preferable solvent content include: 80-95 weight % of methylene chloride and 5-20 weight % of methanol; and 60-95 weight % of methyl acetate and 5-40 weight % of ethanol. A dope may preferably contain 0.01-2 weight % of water.

In the process of preparing a dope, cellulose ester is dissolved using a common method. Dissolving cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperature is higher than the ambient pressure boiling point of the mixed solvents, and simultaneously the temperature is in the range where the mixed solvents do not boil under the applied higher pressure. The following dissolving method is also preferable, in which cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes very high. The dissolving temperature is preferably 45-120° C., more preferably 60-110° C. and still more preferably 70-105° C. The pressure should be controlled not to allow boiling at the set temperature.

A low temperature dissolution method is also preferably utilized, by which cellulose ester is successfully dissolved in a solvent such as methyl acetate.

In the next process, the cellulose ester solution thus prepared is filtered using an appropriate filter material. A filter material with a smaller absolute filtration accuracy is more preferable for removing insoluble materials, however, too small a filtration accuracy easily cause clogging up of the filter. The absolute filtration accuracy of the filter is preferably not larger than 0.008 mm, more preferably 0.001-0.008 mm and still more preferably 0.003-0.006 mm.

The filter material used in the present invention is not specifically limited, and plastic filters (such as polypropylene and Teflon®) as well as metal (alloy) filters (such as stainless steel) are preferable, since these materials are free from peeling of a fiber, which may occur when fibrous material is used. Impurities and, specifically, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicols state, illuminated with a light from one side and observed from the other side. The number of luminescent foreign materials of larger than 0.01 mm in diameter is preferably less than 200 per $cm^2$, more preferably less than 100 per $cm^2$ and still more preferably from 0 to 10 per $cm^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering (also referred to as a pressure difference) is reduced. The filtering temperature is preferably from 45 to 120° C., more preferably from 45 to 70° C. and still more preferably from 45 to 55° C.

The pressure applied during filtering is preferably low, being preferably not more than 1.6 Mpa, more preferably not more than 1.2 MPa and still more preferably not more than 1.0 MPa.

Casting of a dope will be explained below:

A metal support polished to a mirror finished surface is used in the flow-casting process. A polished stainless steel belt or a plated cast drum is used as a metal support. The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web. The temperature of the support depends on the solvent, however, is preferably in the range of 0-70° C., and more preferably 5-40° C. Another preferable method is that a web is gelated by cooling the drum followed by peeling the web from the drum while the web still contains much solvent. The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, an air temperature higher than the desired temperature is sometimes used.

In order to obtain a cellulose ester film with a sufficient flatness, the residual solvent content of the web when it is peeled from a metal support is preferably 10-150% by weight, however, it is more preferably 20-40% by weight or 60-130% by weight. The residual solvent content is specifically more preferably 20-30% by weight or 70-120% by weight.

The residual solvent content of the web is defined by the following formula:

Residual solvent content(% by weight)=$\{(M-N)/N\} \times 100$ where M represents the weight of a sample of the web collected in the manufacturing process or after manufacturing, and N represents the weight of the same sample after it was dried at 115° C. for 1 hour.

In the drying process of a cellulose ester film, the film is peeled from the support and further dried until the residual solvent decreases below not more than 1 weight %, more preferably not more than 0.1 weight %, specifically preferably 0-0.01 weight %.

In this process, preferable is to simultaneously use the above tenter method and a roll drying method in which a cellulose ester film is passed through many rollers placed alternatively up and down in a staggered manner. The method to dry the web is not specifically limited, however, generally, hot air, IR rays or heated rollers, for example. Hot air is preferably used with respect to low cost. The preferable drying temperature of a web is from 40 to 180° C. The temperature is preferably increased stepwise. In to obtain the effect of the present invention, a higher drying temperature is preferable and the drying temperature of 100 to 150° C. is specifically preferable to obtain an improved dimensional stability.

The cellulose ester film of the present invention is preferably stretched in a ratio of 1.00 to 2 at least in one direction. It is specifically preferable that the film is stretched in the film transport direction (the longitudinal direction) just after peeled from the support while containing much residual solvent, followed by stretching in the width direction (the lateral direction) by clipping both edges of the film in a tenter (biaxial stretching).

The stretch ratios in both the longitudinal direction and the lateral direction of the film are preferably in the range of 1.01 to 1.5, more preferably 1.02 to 1.3 and specifically preferably 1.01 to 1.1.

A stretch ratio of 1.01 to 1.3 is preferable because an excellent flatness and a lower haze are obtained.

A film is preferably peeled from the support with a tension of not less than 210 N/m and more preferably with a tension of 220 to 300 N/m in order to stretch the film in the longitudinal direction just after peeled.

The cellulose ester film of the present invention is preferably a long roll film with a length of 1000 to 6000 m. The width of the film is preferably 1.4 to 4 m. The film preferably has areas on both edges of the film which are subjected to a knurling treatment of which height is 10 to 25% of the thickness of the film.

<Properties>

Moisture permeability of the cellulose ester film of the present invention at 40° C., 90% RH is preferably not more than 850 $g/m^2 \cdot 24$ h, more preferably from 20 to 800 $g/m^2 \cdot 24$ h and specifically preferably from 20 to 750 $g/m^2 \cdot 24$ h. Moisture permeability is determined employing the method prescribed in JIS Z 0208.

The elongation at break of a cellulose ester film of the present invention is preferably from 10 to 80 percent and more preferably from 20 to 50 percent.

The visible-light transmittance of a cellulose ester film of the present invention is preferably not less than 90 percent and more preferably not less than 93 percent.

Haze of the cellulose ester film in the present invention is preferably less than 1 percent and more preferably from 0 to 0.1 percent.

The elastic modulus of the cellulose ester film of the present invention is preferably 3000-6000 MPa.

The weight change of the cellulose ester film of the present invention after heat treated at 60° C. under 90% RH for 500 hours is preferably less than 1%.

The in-plane retardation value (Ro) of the cellulose ester film of the present invention is 0 to 5 nm and the retardation value in the thickness direction (Rt) is −20 to 10 nm at the condition of ambient temperature and ambient humidity (23° C. and 55% RH).

Retardation values (Ro) and (Rt) are represented by the following formulae.

$$Ro=(nx-ny)\times d$$

$$Rt=((nx+ny)/2-nz)\times d$$

wherein d is thickness (nm) of the film, nx is the maximum in-plane refractive index of the film (also referred to as the refractive index in the slow axis direction), ny is the in-plane refractive index of the film in the direction orthogonal to the slow axis direction and nz is the refractive index in the thickness direction of the film.

Retardation values Ro and Rt are determined by means of an automatic birefringence meter, for example, KOBRA-21ADH (manufactured by Oji Scientific Instruments) at 23° C. and under 55% RH employing a 590 nm wavelength light.

The slow axis preferably exists within ±10 of the lateral direction or within ±1° of the longitudinal direction of the film.

The cellulose ester film of the present invention is preferably employed as a polarizing plate protective film. The polarizing plate protective film is preferably provided on the observation side of the polarizing plate and, on at least one surface, a functional layer, for example, described below is preferably provided.

The transparent protective film (the polarizing plate protective film) to be used in the present invention is preferably provided with a hard coat layer as a functional layer.

The hard coat layer of the present invention is provided on at least one surface of a polarizing plate protective film. The polarizing plate protective film of the present invention preferably has antireflection layers (a high refractive index layer and a low refractive index layer) on the lard coat layer to form an anti-reflection film.

An actinic ray curable resin layer is preferably used as the hard coat layer.

The actinic ray curable resin layer refers to a layer which contains, as a main component, a resin cured through a crosslinking reaction when exposed to actinic rays such as UV light or electron beams. The actinic ray curable resin layer preferably contains an ethylenically unsaturated monomer, which is exposed to actinic rays such as UV light or electron beams and cured to form a hard coat layer. Listed as representative actinic ray curable resins are UV curable resins as well as electron beam curable resins. The actinic ray curable resin is preferably a UV curable resin.

Listed as UV curable resins may be, for example, UV curable urethane acrylate resins, UV curable polyester acrylate resins, UV curable epoxy acrylate resins, UV curable polyol acrylate resins, or UV curable epoxy resins.

The UV curable urethane acrylate resins are easily prepared in such a manner that acrylate based monomers having a hydroxyl group such as 2-hydroxyethyl acrylate, 2-hydroxyethyl methacrylate (hereinafter, acrylate includes acrylate itself and methacrylate, and acrylate represents both), or 2-hydroxypropyl acrylate are allowed to react with the product which is commonly prepared by allowing polyester polyols to react with isocyanate monomers or prepolymers. For example, those described in Japanese Patent O.P.I. Publication No. 59-151110 can be used.

For example, preferably employed is a mixture comprising 100 parts of Unidick 17-806 (manufactured by Dainippon Ink and Chemicals Inc.) and one part of Coronate L (manufactured by Nippon Urethane Industry Co., Ltd.).

The UW ray curable polyester acrylate resins include those prepared easily by reacting a polyester polyol with 2-hydroxyethylacrylate or 2-hydroxypropylacrylate, disclosed for example, in Japanese Patent O.P.I. Publication No. 59-151112.

Examples of the UV ray curable epoxy acrylate resin include those prepared by reacting an epoxy acrylate oligomer in the presence of a reactive diluting agent and a photoinitiator, disclosed for example, in Japanese Patent O.P.I. Publication No. 1-105738.

Examples of the UV ray curable polyol acrylate resin include trimethylolpropane triacrylate, ditrimethylolpropane tetraacrylate, pentaerythritol triacrylate, pentaerythritol tetraacrylate, dipentaerythritol hexaacrylate or alkyl-modified dipentaerythritol pentaacrylate.

The photoinitiators for the UV ray curable resins include benzoine or its derivative, or acetophenones, benzophenones, hydroxy benzophenones, Michler's ketone, α-amyloxime esters, thioxanthones or their derivatives. an oxime ketone derivative, a benzophenone derivative or a thioxanthone derivative. These photoinitiators may be used together with a photo-sensitizer. The above photoinitiators also work as a photo-sensitizer. Sensitizers such as n-butylamine, triethylamine and tri-n-butylphosphine can be used in photo-reaction of epoxyacrylates. The content of the photoinitiators or sensitizers in the UV ray curable resin layer is 0.1 to 15 parts by weight, and preferably 1 to 10 parts by weight, based on the 100 parts by weight of the UV ray curable resin layer.

The polymerizable monomers having one unsaturated double bond in the molecule include methyl acrylate, ethyl acrylate, butyl acrylate, benzyl acrylate, cyclohexyl acrylate, vinyl acetate, and styrene. The polymerizable monomers having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate, trimethylol propane triacrylate, and pentaerythritol tetraacrylate.

The UV curable resins available on the market utilized in the present invention include Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

These actinic ray curable resin layers can be applied by any method well known in the art, for example: a gravure coater, a dip coater, a reverse coater, a die coater and ink jet printing.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. An air cooling or a water cooling light source is preferably used. The preferable irradiation quantity of light may be changed depending on the type of lamp, however, it is preferably from 5 to 150 mj/cm$^2$, and more preferably from 20 to 100 mJ/cm$^2$.

The oxygen content at the irradiation area is preferably decreased to 0.01-2% by purging with nitrogen.

Irradiation of an actinic ray is preferably carried out under tension in the longitudinal direction of the film and more preferably under tension in both the lateral and the longitudinal directions. The preferable tension is from 30 to 300 N/m. The method to provide tension is not specifically limited and following methods are preferably used: (i) a method of providing tension while the film is being transported over back rolls, and (ii) a method using a tenter to give tension in the lateral direction or in biaxial directions. A cellulose ester film exhibiting a superior flatness can be obtained using these methods.

An organic solvent used for a coating solution of a UV curable-resin can be selected from, for example, the hydrocarbon series (toluene and xylene), the alcohol series (methanol, ethanol, isopropanol, butanol and cyclohexanol), the ketone series (acetone, methyl ethyl ketone and isobutyl ketone), the ester series (methyl acetate, ethyl acetate and methyl lactate), the glycol ether series and other organic solvents. These organic solvents may be also used in combination. The above mentioned organic solvents preferably contain propylene glycol monoalkyl ether (the alkyl having 1 to 4 carbon atoms) or propylene glycol monoalkyl ether acetate (the alkyl having 1 to 4 carbon atoms) in an amount of 5% by weight or more, and more preferably from 5 to 80% by weight.

In a coating solution of a UV ray-curable resin, a silicon compound such as a polyether modified silicone oil, is preferably added. The number average molecular weight of the polyether modified silicone oil is preferably from 1,000 to 100,000 and more preferably from 2,000 to 50,000. Addition of the polyether modified silicone oil with a number average molecular weight of less than 1,000 may lower the drying rate of the coating solution, while that of more than 100,000 may be difficult to bleed out at the surface of the coated film.

Silicon compounds available on the market include, for example: DKQ8-779 (a trade name of Dow Corning Corp.), SF3771, SF8410, SF8411, SF8419, SF8421, SF8428, SH200, SH510, SH1107, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, siliconeX-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BYK-Chemie Japan KK), L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of a coating solution onto a substrate or an under coat layer. These compounds used in the top layer of film may contribute to improvement of scratch resistance of the film as well as water-resistance, oil-resistance and anti-stain properties of the film. The content of the silicon compound is preferably from 0.01 to 3% by weight based on the solid components in the coating solution.

The aforementioned coating methods are also used as coating method of a UV ray-curable resin layer coating solution. The wet thickness of the coated UV-curable resin layer is preferably from 0.1 to 30 μm and more preferably from 0.5 to 15 μm. The dry thickness of the coated UV-curable resin layer is preferably from 0.1 to 20 μm and more preferably from 1 to 10 μm.

The UV ray-curable resin layer is preferably irradiated with UV rays during or after drying. The duration of UV ray irradiation is preferably from 0.1 seconds to 5 minutes in order to secure the exposure amount from 5 to 100 mJ/cm$^2$ as mentioned above. In view of working efficiency and hardening efficiency of the UV-curable resin layer, the duration is more preferably from 0.1 to 10 seconds.

Intensity of the actinic ray is preferably from 50 to 150 mW/cm$^2$ on the irradiated surface.

The UV-cured resin layer thus obtained may preferably contain inorganic or organic particles in order to attain the following characteristics: (i) preventing blocking, (ii) improving scratch resistance, (iii) providing an antiglare property and (iv) optimizing the reflective index.

The hard coat layer of the present invention preferably contains inorganic particles, examples of which include, for example: silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Organic particles include, for example: particles of polymethacrylic acid methyl acrylate resin, acryl styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic particles include, for example: particles of cross-linked polystylene (such as SX-130H, SX-200H and SX-350H manufactured by Soken Chemical &

Engineering Co., Ltd.) and polymethyl methacrylate (such as MX150 and MX300 manufactured by Soken Chemical & Engineering Co., Ltd.).

The average particle diameter of the particles is preferably from 0.005 to 5 μm and specifically preferably from 0.01 to 1 μm. The particle content of the hard coat layer is preferably from 0.1 to 30 weight parts per 100 weight parts of the UV-curable resin composition.

It is preferred that the UV curable resin layer is a clear hard coat layer having a center-line average roughness (Ra prescribed by JIS B 0601) of 1 to 50 nm or an anti-glare layer Having an Ra value of from 0.1 to 1 μm. The center-line average roughness (Ra) is preferably measured by means of a surface roughness meter using interference of light, for example, RST/PLUS manufactured by WYKO Co., Ltd.

The hard coat layer of the present invention may preferably contain an antistatic agent. For example, preferable are an electrically conductive material containing as a main ingredient at least one of the element selected from the group of Sn, Ti, In, Al, Zn, Si, Mg, Ba, Mo, W and V, and having a volume resistivity of not more than $10^7$ ohm·cm.

Examples of the antistatic agent also include: oxides and complex oxides of the above described elements.

Examples of a metal oxide include: ZnO, $TiO_2$, $SnO_2$, $Al_2O_3$, $In_2O_3$, $SiO_2$, MgO, BaO, $MoO_2$, $V_2O_5$ and complex metal oxides thereof. Of these, specifically preferable are, for example, ZnO, $In_2O_3$, $TiO_2$, and $SnO_2$. As examples of indroduction of foreign element, effective are, (i) introduction of, for example, Al or In in ZnO; (ii) introduction of, for example, Nb or Ta in $TiO_2$; and (iii) introduction of, for example, Sb, Nb or a halogen atom in $SnO_2$. The amount of the foreign element is preferably 0.01-25 mol % and specifically preferably 0.1-15 mol %. The volume resistivity of these conductive metal oxide powder is preferably 107 ohm·cm or less and specifically preferably 105 ohm·cm or less.

(Antireflection Layer)

The polarizing plate protective film of the present invention preferably has an antireflection layer as a functional layer on the above mentioned hard coat layer, and specifically preferable is to have a low refractive index layer containing hollow particles.

(Low Refractive Index Layer)

The low refractive index layer of the present invention preferably contains hollow particles, and, in addition, preferably contains silicon alkoxide, a silane coupling agent and a hardening agent.

<Hollow Particles>

In the low refractive index layer, hollow particles described below are preferably incorporated.

The hollow particles can be classified into (1) the composite particles made of porous particle and the coated layer arranged on this porous particle surface; and (2) the hollow particles that have a hollow interior filled with solvent, gas or porous substances. The low-refractive index layer coating solution may contain (1) composite particles and/or (2) hollow particles.

The hollow particles have a hollow interior which is surrounded with particle walls. The cavity is filled with the solvent used at the time of preparation, gas or porous substances. The average particle diameter of such inorganic particles is preferably 5-300 nm, more preferably 10-200 nm. The inorganic particles to be used is properly selected according to the thickness of the transparent coating layer to be formed. The diameter is preferably ⅔-1/10 that of the transparent coating layer such as low-refractive index layer to be formed. For formation of the low-refractive index layer, these hollow particles are preferably used as they are dispersed in a proper medium. The preferred dispersion medium includes water, alcohol (e.g. methanol, ethanol, isopropyl alcohol) and ketone (e.g. methyl ethyl ketone and methyl isobutyl ketone) and ketone alcohol (e.g. diacetone alcohol).

The thickness of the coated layer of the composite particle or hollow particle wall is preferably 1-20 nm and more preferably, 2-15 nm. In the case of the composite particle, if the thickness of the coated layer is less than 1 nm, the particles may not completely be covered, resulting in reducing the effect of the low-refractive index layer. If the thickness of the coated layer exceeds 20 nm, the porosity (porous volume) of the composite particle may be reduced, resulting in reducing the effect of the low-refractive index layer. In the case of hollow particles, if the thickness of the particle wall is less than 1 nm, the shape of the particle may not be maintained. If the thickness exceeds 20 nm, a sufficient effect of low-refractive index may not be obtained.

The coated layer of the composite particle or hollow particle wall is preferably made of silica as a main component. A component other than silica may be contained, of which specific examples include: $Al_2O_3$, $B_2O_3$, $TiO_2$, $ZrO_2$, $SnO_2$, $CeO_2$, $P_2O_3$, $Sb_2O_3$, $MoO_3$, ZnO and $WO_3$. The porous particles constituting composite particle include: (i) those composed of silica; (ii) those composed of silica and inorganic compound other than silica; and (iii) those composed of $CaF_2$, NaF, $NaAlF_6$, or $MgF_2$. Of these, the porous particles made of composite oxide of silica and inorganic compound other than silica are preferably used. The inorganic compound other than silica can be exemplified by the compound made of one or two of: $Al_2O_3$, $B_2O_3$, $TiO_2$, $ZrO_2$, $SnO_2$, $CeO_2$, $P_2O_3$, $Sb_2O_3$, $MoO_3$, ZnO and $WO_3$. In such porous particles, silica is expressed by $SiO_2$ and the inorganic compound other than silica is represented by the equivalent oxide (MOx). In this case, the mole ratio $MOx/SiO_2$ is preferably within the range of 0.0001-1.0, more preferably 0.001-0.3. Particles cannot be easily obtained if the mole ratio $MOx/SiO_2$ of the porous particle is less than 0.0001. Even if it can be obtained, the pore volume will be small, and the particle of small refractive index cannot be obtained. If the mole ratio $MOx/SiO_2$ of the porous particle exceeds 1.0, the content of silica is reduced, hence the pore volume will be increased. This may make it all the more difficult to get the particles giving a low refractive index.

The pore volume of such porous particles is preferably 0.1-1.5 ml/g, more preferably 0.2-1.5 ml/g. If the pore volume is less than 0.1 ml/g, the particles of sufficiently reduced refractive index cannot be ensured. If it exceeds 1.5 ml/g, the strength of the particles will be reduced, hence the strength of the produced film may be reduced.

The pore volume of such porous particle can be determined by the method of mercury penetration. The contents inside the hollow particle can be exemplified by the solvent, gas and porous substance used at the time of preparing the particles. The solvent may contain the unreacted substances of the particle precursor and the catalysts used at the time of preparing the hollow particle. The porous substances includes the compounds listed with reference to the aforementioned porous particle. These contents may be made of a single compound or a mixture of a plurality of compounds.

To produce such inorganic particles, the composite oxide colloid particle preparation methods disclosed in the paragraph numbers [0010] through [0033] of JP-A No. 7-133105 are preferably employed. To put it more specifically, when the composite particle is made of silica and inorganic compound other than silica, the hollow particles are manufactured according to the first through third Steps given below:

1st Step: Preparation of Porous Particle Precursor

In the first Step, aqueous alkaline solutions of silica material and inorganic compound material other than silica are prepared separately in advance or, the aqueous solution of a mixture of silica material and inorganic compound material other than silica is prepared. In response to the percentage of the composite of the intended composite oxide, this aqueous solution is added, with stirring, gradually into the alkaline solution having a pH greater than 10, whereby the porous particle precursor is prepared.

The silicate of alkali metal, ammonium or organic base is used as a silica material. Sodium silicate (water glass) or potassium silicate is utilized as the silicate of alkali metal. The organic base can be exemplified by quaternary ammonium salts such as tetraethyl ammonium salts, and amines such as monoethanol amine, diethanol amine and triethanol amine. The silicates of the ammonium or silicates of the organic salts also includes alkaline solution obtained by adding ammonia, quaternary ammonium hydroxide and amine compound to the silica solution.

As the inorganic compound material other than silica, alkali soluble conductive materials described above are used.

The pH value of the aqueous mixture solution undergoes changes with addition of these aqueous solution. However, it is not necessary to control this pH value within the predetermined range. In the final phase, the aqueous solution has the pH value determined by the type of the inorganic oxide and its bending ratio. There is no restriction to the speed of adding the aqueous solution in this case. Further, when the composite oxide particle is manufactured, the aqueous dispersion of the seed particle can be used as the starting material. There is no particular restriction on this seed particle. The particles made of inorganic oxide such as $SiO_2$, $Al_2O_3$, $TiO_2$ or $ZrO_2$ or the composite oxide thereof are utilized. Normally, the sol thereof can be used. Further, the porous particle precursor aqueous dispersion obtained according to the aforementioned production method can be used as seed particle aqueous dispersion. When the seed particle aqueous dispersion is used, the pH value of seed particle aqueous dispersion is adjusted to 10 or more. After that, the aqueous solution of the aforementioned compound is added to this seed particle aqueous dispersion, being stirred in aqueous alkaline solution. In this case, the pH value of the aqueous dispersion need not necessarily be controlled. Use of the seed particles are used in this manner, ensures easy control of the diameter of the porous particle to be prepared, and provides uniform particle sizes.

The aforementioned silica material and inorganic compound material exhibit a high degree of solubility on the alkali side. However, if they are mixed in the pH region where the solubility is high, the solubility of the oxo acid such as silica ion and aluminic acid ion will be reduced. Their composites will be deposited to grow into particles. Alternatively, they will be deposited on the seed particle to cause particle growth. This being the case, pH control is not always necessary at the time of deposition and growth of the particles, as in the conventional method.

The ratio of composition of silica and inorganic compound other than silica in the first Step is determined as follows: The inorganic compound with respect to silica is converted into the equivalent oxide ($MO_x$), and the mole ratio of the $MO_x/SiO_2$ is kept preferably within the range of 0.05-2.0, more preferably 0.2-2.0. The small the ratio of silica within this range, the greater the pore volume of the porous particle. However, even if the mole ratio is over 2.0, the pore volume of the porous particle hardly increases. If the mole ratio is less than 0.05, the pore volume reduces. When the hollow particle is prepared, the mole ratio of the $MOx/SiO_2$ is preferably 0.25-2.0.

2nd Step: Removal of the Inorganic Compound Other than Silica from the Porous Particle In the second Step, at least part of the inorganic compound other than silica (elements other than silicon and oxygen) is removed on a selective basis from the porous particle precursor having been obtained in the aforementioned first Step. To put it more specifically, the inorganic compound in the porous particle precursor is dissolved and removed by mineral acid and organic acid. Alternatively, it is brought in contact with a positive ion exchange resin and is removed by ion exchange.

The porous particle precursors obtained in the first Step are the particle of a network structure composed of a silicon and inorganic compound constituent element bonded together through oxygen. As described above, the porous particles characterized by one layer of porous structure and greater pore volume are provided by removing the inorganic compound (elements other than silicon and oxygen) from the porous particle precursor. Hollow particles can be prepared by increasing the amount of the inorganic compound (elements other than silicon and oxygen) removed from the porous particle precursor.

Before removing the inorganic compound (elements other than silicon and oxygen) from the porous particle precursor, silica solution or hydrolytic organic silicon compound, obtained by dealkalization of the alkali metal salt of silica, is preferably added to the porous particle precursor aqueous dispersion obtained in the first Step, whereby a silica protective film is formed. It is sufficient only if silica protective film has a thickness of 0.5-15 nm. Even if a silica protective film is formed, the protective film in this Step is porous and is less thick. Such being the case, the aforementioned inorganic compound other than silica can be removed from the porous particle precursor.

By forming such a silica protective film, the aforementioned inorganic compound other than silica can be removed from the porous particle precursor, with the shape of the particle kept unchanged. When forming the silica coated layer to be described later, porous particle pores are not blocked by the coated layer. This makes it possible to form the silica coated layer (to be described later) without the pore volume being reduced. When a small amount of inorganic compound is removed, the particles are not damaged. Accordingly, formation of a protective film is not imperative.

When hollow particles are prepared, this silica protective film is preferably formed. If the inorganic compound is removed in preparing hollow particles, a hollow particle precursor is obtained, wherein this hollow particle precursor is made of silica protective film, solvent inside this silica protective film and undissolved porous solid. If the coated layer to be described later is formed on this hollow particle precursor, the coated layer having been formed becomes a particle wall and hollow particles are formed.

The amount of the silica source added to form the aforementioned silica protective film is preferably as small as possible without damaging the particle shape. If the amount of silica source is excessive, the silica protective film will be too thick. This may make it difficult to remove the inorganic compound other than silica from the porous particle precursor. The alkoxy silane expressed by the formula $R_nSi(OR')_{4-n}$ [R,R': hydrocarbon group such as alkyl group, aryl group, vinyl group and acryl group; n=0, 1, 2 or 3] can be used as a hydrolytic organic silicon compound used to form the silica protective film. Specifically, tetraalkoxy silane such as tetramethoxysilane, tetraethoxysilane and tetraisoprophoxysilane is preferably utilized.

The following procedure is used for addition: The solution prepared by adding a small quantity of alkali or acid as the catalyst to the mixture solution of the alkoxy silane, demineralized water and alcohol is added to the aqueous dispersion of the aforementioned porous particle. The silica polymer generated by hydrolysis of the alkoxy silane is deposited on the surface of the inorganic oxide particle. In this case, the alkoxy silane, alcohol, catalyst can be added simultaneously in the aqueous dispersion. Ammonia, hydroxide of alkali metal and amines can be used as the alkali catalyst. Varieties of inorganic and organic acids can be used as acid catalyst.

When the dispersion medium of the porous particle precursor is water alone or contains a high proportion of water with respect to the organic solvent, silica solution can be used to form a silica protective film. When the silica solution is used, a predetermined amount of silica solution is added to the aqueous dispersion. At the same time, alkali is added so that silica solution is deposited on the porous particle surface. A silica protective film can be produced by a combined use of the silica solution and the aforementioned alkoxy silane.

3rd Step: Formation of Silica Coated Layer

In the third step, the hydrolytic organic silicon compound or silica solution is added to the porous particle aqueous dispersion (hollow particle precursor aqueous dispersion in the case of the hollow particle) prepared in the second Step. This procedure ensures that the particle surface is covered with the polymer such as the hydrolytic organic silicon compound or silica solution, whereby a silica coated layer is formed.

The alkoxy silane expressed by the aforementioned formula $R_n Si(OR')_{4-n}$ [R,R': hydrocarbon group such as alkyl group, aryl group, vinyl group and acryl group; n=0, 1, 2 or 3] can be used as the hydrolytic organic silicon compound used for forming the silica coated layer. Especially, the tetraalkoxy silane such as tetramethoxysilane, tetraethoxysilane and tetraisoprophoxysilane is preferably used.

The following procedure is taken for addition: The solution prepared by adding a small quantity of alkali or acid as the catalyst to the mixture solution of the alkoxy silane, demineralized water and alcohol is added to the aqueous dispersion of the aforementioned porous particle (hollow particle precursor in this case of the hollow particle). The silica polymer generated by hydrolysis of the alkoxy silane is deposited on the surface of the porous particle (hollow particle precursor in this case of the hollow particle). In this case, the alkoxy silane, alcohol, catalyst can be added simultaneously in the aqueous dispersion. Ammonia, hydroxide of alkali metal and amines can be used as the alkali catalyst. Varieties of inorganic and organic acids can be used as acid catalyst.

When the dispersion medium of the porous particle (hollow particle precursor in this case of the hollow particle) is water alone or the solution of mixture with the organic solvent wherein the proportion of water is high with respect to the organic solvent, then silica solution can be used to form a silica protective film. The silica solution refers to the aqueous solution of the low polymer of silica obtained by dealkalization of aqueous solution of alkali metal silicate such as water glass through ion exchange treatment.

The silica solution is added to the porous particle (hollow particle precursor in this case of the hollow particle) aqueous dispersion. At the same time, alkali is added so that the silica low-polymer is deposited on the surfaced of the porous particle (hollow particle precursor in this case of the hollow particle). The silica solution can be used in combination with the aforementioned alkoxy silane so that a coated layer is formed. The amount of organic silicon compound or silica solution added to form the coated layer should be such that the surface of the colloid particle is sufficiently covered. The organic silicon compound or silica solution is added in the dispersion of the porous particle (hollow particle precursor in this case of the hollow particle), in such an amount that the silica coated layer obtained in the final phase has a thickness of 1-20 nm. When the aforementioned silica protective film has been formed, the organic silicon compound or silica solution is added in such an amount that the total of the thicknesses of the silica protective film and silica coated layer is within the range of 1-20 nm.

Then the aqueous dispersion of the particles of which the coated layer is formed is subjected to heating. In the case of porous particles, the silica coated layer covering the porous particle surface is made compact by heating, thereby producing the dispersion of composite particles wherein porous particles are covered with the silica coated layer. In the case of hollow particle precursor, the coated layer having been formed is made compact and becomes a hollow particle wall, thereby producing the dispersion of hollow particles having a cavity filled with solvent, gas or porous solid.

There is no particular restriction to the heating temperature in this case, if the microscopic pore of the silica coated layer can be blocked. The heating temperature is preferably within the range of 80-300° C. If the heating temperature is less than 80° C., the microscopic pore of the silica coated layer may be completely blocked and may not be made compact. Alternatively, a longer time will be required in some cases. If the heating temperature is over 300° C., compact particles may be produced and the advantages of low-refractive index cannot be ensured in some cases.

The refractive index of the inorganic particles obtained in this manner is as low as less than 1.44. In such inorganic particles, the porosity inside the porous particle or the interior is void. This is estimated to cause low refractive index.

It is preferable that other than hollow particles, the low refractive index layer incorporates hydrolyzed products of alkoxysilicon compounds and condensation products which are formed via the following condensation reaction. It is particularly preferable to incorporate a $SiO_2$ sol prepared employing the alkoxysilicon compounds represented by following Formula (4) and/or (5) or hydrolyzed products thereof.

$$R1\text{-}Si(OR_2)_3 \quad \text{Formula (4)}$$

$$Si(OR_2)_4 \quad \text{Formula (5)}$$

wherein R1 represents a methyl group, an ethyl group, a vinyl group, or an organic group incorporating an acryloyl group, a methacryloyl group, an amino group, or an epoxy group, and R2 represents an methyl group or an ethyl group.

Hydrolysis of silicon alkoxide and silane coupling agents is performed by dissolving the above in suitable solvents. Examples of used solvents include ketones such as methyl ethyl ketone, alcohols such as methanol, ethanol, isopropyl alcohol, or butanol, esters such as ethyl acetate, or mixtures thereof.

Water in a slightly larger amount for hydrolysis is added to a solution prepared by dissolving the above silicon alkoxide or silane coupling agents in solvents, and the resulting mixture is stirred at 15-35° C. but preferably 20-30° C. for 1-48 hours but preferably 3-36 hours.

It is preferable to employ catalysts during the above hydrolysis. Preferably employed as such catalysts are acids such as hydrochloric acid, nitric acid, or sulfuric acid. These acids are employed in the form of an aqueous solution at a concentration of 0.001-20.0 N, but preferably 0.005-5.0 N. It is possible to employ water in the above aqueous catalyst solution as water for hydrolysis.

Alkoxysilicon compounds undergo hydrolysis over the specified period of time, and the hydrolyzed alkoxysilicon solution is diluted with solvents, followed by the addition of other necessary additives, whereby a low refractive index layer liquid coating composition is prepared. It is possible to form a low refractive index layer on a substrate by applying the above liquid coating composition onto a substrate such as a film followed by drying.

<Alkoxysilicon Compounds>

In the present invention, preferred as alkoxysilicon compounds (hereinafter also referred to as alkoxysilanes) employed to prepare the low refractive index layer liquid coating composition are those represented by following Formula (6).

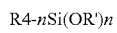

$$R_{4-n}Si(OR')_n \qquad \text{Formula (3)}$$

wherein R' represents an alkyl group; R represents a hydrogen atom or a univalent substituent; and n represents 3 or 4.

The alkyl groups represented by R' include groups such as a methyl group, an ethyl group, a propyl group, or a butyl group, which may have a substituent. The substituents are not particularly limited as long as characteristics as an alkoxysilane are maintained. Examples of such substituents include a halogen atom such as fluorine and an alkoxy group, but unsubstituted alkyl groups are more preferred. Particularly preferred are a methyl group and an ethyl group.

The univalent substituents represented by R are not particularly limited, and examples include an alkyl group, a cycloalkyl group, an alkenyl group, an aryl group, an aromatic heterocyclyl group, and a silyl group. Of these, preferred are an alkyl group, a cycloalkyl group, and an alkenyl group. These may be further substituted. Cited as substituents of R are a halogen atom such as a fluorine atom or a chlorine atom, an amino group, an epoxy group, a mercapto group, a hydroxyl group, and an acetoxy group.

Specific preferable examples of the alkoxysilane represented by the above formula include tetramethoxysilane, tetraethoxysilane (TEOS), tetra-n-propoxysilane, tetraisopropoxysilane, tetra-n-butoxysilane, tetra-t-butoxysilane, tetrakis(methoxyethoxy)silane, tetrakis(methoxypropoxy)silane, methyltrimethoxysilane, methyltriethoxysilane, ethyltrimethoxysilane, ethyltriethoxysilane, n-propyltrimethoxysilane, n-propyltriethoxysilane, n-butyltrimethoxysilane, i-butyltrimethoxysilane, n-hexyltrimethoxysilane, 3-glycycloxyproyltrimethoxysilane, 3-aminopropyltriethoxysilane, 2-(3,4-epoxycyclohexyl)ethyltrimethoxysilane, 3-chloropropyltrimethoxysilane, 3-mercaptopropyltrimethoxysilane, acetoxytriethoxysilane, (heptadecafluoro-1,1,2,2-tetrahydrodecyl)trimethoxysilane, (3,3,3-trifluoropropyl)trimethoxysilane, (3,3,3-trifluoropropyl)trimethoxysilane, pentafluorophenylpropyltrimethoxysilane, further vinyltrimethoxysilane, vinyltriethoxysilane, phenyltrimethoxysilane, vinyltrimethoxysilane, and vinyltriethoxysilane.

Further, included may be silicon compounds in the form of oligomers such as SILICATE 40, SILICATE 45, SILICATE 48, and M SILICATE 51, produced by Tamagawa Chemical Co., which are partial condensation products of the above compounds.

Since the above alkoxysilanes incorporate silicon alkoxide group capable of undergoing hydrolysis polycondensation, the network structure of polymer compounds is formed in such a manner that these alkoxysilanes undergo hydrolysis, condensation and crosslinking. The resulting composition is employed as a low refractive index layer liquid coating composition which is applied onto a substrate and dried, whereby a layer uniformly incorporating silicon oxide is formed on the substrate.

It is possible to perform a hydrolysis reaction employing the method known in the art. Hydrophilic alkoxysilanes are dissolved in a mixture of water of the specified amount and hydrophilic organic solvents such as methanol, ethanol, or acetonitrile so that alkoxysilanes are compatible with solvents. After the addition of hydrolysis catalysts, alkoxysilanes undergo hydrolysis and condensation. By performing the hydrolysis and condensation reaction commonly at 10-100° C., silicate oligomers in a liquid state, having at least two hydroxyl groups, are formed, whereby a hydrolyzed liquid composition is prepared. It is possible to appropriately control the degree of hydrolysis varying the amount of employed water.

In the present invention, preferred as solvents added to alkoxysilanes together with water are methanol and ethanol since they are less expensive and form a layer exhibiting excellent characteristics and desired hardness. It is possible to employ isopropanol, n-butanol, isobutanol, and octanol, while the hardness of the resulting layer tends to decrease. The amount of solvents is commonly 50-400 parts by weight with respect to 100 parts by weight of tetraalkoxysilanes prior to hydrolysis, but is preferably 100-250 parts by weight.

The hydrolyzed liquid composition is prepared as described above. The above composition is diluted with solvents, and if desired, added with additives. Subsequently, components required to form a low refractive index layer liquid coating composition are mixed, whereby a low refractive index layer liquid coating composition is prepared.

Cited as hydrolysis catalysts may be acids, alkalis, organic metals, and metal alkoxides. In the present invention, preferred are inorganic acids such as sulfuric acid, hydrochloric acid, nitric acid, hypochlorous acid, or boric acid, or organic acids. Of these, particularly preferred are nitric acid, carboxylic acids such as acetic acid, polyacrylic acid, benzenesulfonic acid, paratoluenesulfonic acid, and methylsulfonic acid. Of these, most preferably employed are nitric acid, acetic acid, citric acid, and tartaric acid. Other than above citric acid and tartaric acid, also preferably employed are levulinic acid, formic acid, propionic acid, malic acid, succinic acid, methylsuccinic acid, fumaric acid, oxalacetic acid, pyruvic acid, 2-oxoglutaric acid, glycolic acid, D-glyceric acid, D-gluconic acid, malonic acid, maleic acid, oxalic acid, isocitric acid, and lactic acid.

Among the above catalysts, preferred are those which do not remain in the layer via evaporation during drying and also exhibit a low boiling point. Accordingly, acetic acid and nitric acid are most preferred.

The added amount is commonly 0.001-10 parts by weight with respect to 100 parts by weight of the employed alkoxysilicon compounds (for example, tetraalkoxysilane), but is preferably 0.005-5 parts by weight. Further, the added amount of water is to be at least the amount capable of performing theoretically 100% hydrolysis of the compound to be hydrolyzed. It is recommended to add water in an equivalent amount of 100-300%, but preferably of 100-200%.

During the hydrolysis of the above alkoxysilanes, it is preferable to blend the following inorganic particles.

After initiation of hydrolysis, a hydrolyzed liquid composition is allowed to stand over the specified period of time. After the hydrolysis reaches the specified degree, the above catalysts are employed. The standing period refers to the sufficient period during which the above hydrolyses and crosslinking due to condensation are progressed to result in desired layer characteristics. The specific period varies depending on the type of acid catalysts, but when acetic acid is employed, the period is at least 15 hours at room temperature, while when nitric acid is employed, the period is preferably at least two hours. Ripening temperature affects ripening temperature. Generally, at a higher temperature, ripening is more promoted. However, since gelling occurs at more than or equal to 100° C., it is appropriate to raise and maintain the temperature between 20-60° C.

The silicate oligomer solution prepared by performing hydrolysis and condensation as described above is added with the above hollow particles and additives, and the resulting mixture is diluted as required, whereby a low refractive index layer liquid coating composition is prepared. Subsequently, the resulting coating composition is applied onto the above film, whereby it is possible to form a layer as a low refractive index layer composed of an excellent silicon oxide layer.

Further, in the present invention, other than the above alkoxysilanes, employed may be the compounds which are prepared by modifying silane compounds (being monomers, oligomers, or polymers) having a functional group such as an epoxy group, an amino group, an isocyanate group, or a carboxyl group, and may be employed individually or in combination.

(Fluorine Compounds)

It is preferable that the low refractive index layer employed in the present invention incorporates hollow particles and fluorine compounds, and also incorporates fluorine containing resins (hereinafter also referred to as "pre-crosslinking fluorine containing resins"), which undergo crosslinking via heat or ionizing radiation. By incorporating the above fluorine containing resins, it is possible to provide a desired stain resistant antireflection film.

Preferably listed as such fluorine containing resins prior crosslinking may be fluorine containing copolymers which are formed employing fluorine containing vinyl monomers and monomers to provide a crosslinking group. Specific examples of the above fluorine containing vinyl monomer units include fluoroolefins (for example, fluoroethylene, vinylidene fluoride, tetrafluoroethylene, hexafluoroethylene, hexafluoropropylene, or perfluoro-2,2-dimethyl-1,3-dioxonol), and alkylester derivatives in which (meth)acrylic acid is partially or completely fluorinated (for example, VISCOAT 6FM (produced by Osaka Yuki Kagaku Co.), or M-2020 (produced by Daikin Co.), completely or partially fluorinated vinyl ethers. Cited as monomers to provide a crosslinking group are vinyl monomers which previously incorporate a crosslinking functional group in the molecule such as glycidyl methacrylate, vinyltrimethoxysilane, γ-methacryloyloxypropyltrimethoxysilane, vinyl glycidyl ether, and in addition, vinyl monomers having a carboxyl group, a hydroxyl group, an amino group, or a sulfone group (for example, (meth)acrylic acid, methylol (meth)acrylate, hydroxyalkyl (meth)acrylate, allyl acrylate, hydroxyalkyl vinyl ether, or hydroxyalkyl allyl ether). JP-A Nos. 10-25388 and 10-147739 describe that it is possible to introduce, after copolymerization, a crosslinking structure to the latter via the addition of compounds having a group capable of reacting with a functional group in the polymers and at least one reactive group. Examples of such crosslinking groups include an acryloyl, methacryloyl, isocyanate, epoxy, aziridine, oxazolidine, aldehyde, carbonyl, hydrazine, carboxyl, methylol, or active methylene group. Cases, in which fluorine containing polymers react with a crosslinking group upon being heated, or undergo crosslinking upon being heated via combinations such as an ethylenic unsaturated group and a thermally radical generating agent, or an epoxy group and a thermally acid generating agents, are designated as a thermal curing type. On the other hand, cases in which crosslinking is performed via a combination of an ethylenic unsaturated group and a photolytically radical generating agent or an epoxy group and a photolytically acid generating agent upon being exposed to radiation (preferably ultraviolet radiation or electron beams), is designated as an ionizing radiation curing type.

In addition to the above monomers, employed as pre-crosslinking fluorine containing resins may be fluorine containing copolymers which are prepared simultaneously employing monomers other than the fluorine containing vinyl monomers and monomers to provide a crosslinking group. Simultaneously usable monomers are not particularly limited and may include olefins (such as ethylene, propylene, isoprene, vinyl chloride, or vinylidene chloride); acrylic acid esters (such as methyl acrylate, ethyl acrylate, or 2-etylhexyl acrylate); methacrylic acid esters (such as methyl methacrylate, ethyl methacrylate, butyl methacrylate, or ethylene glycol dimethacrylate); styrene derivatives (such as styrene, divinylbenzene, vinyltoluene, or α-methylstyrene); vinyl ethers (such as methyl vinyl ether); vinyl esters (such as vinyl acetate, vinyl propionate, or vinyl cinnamate); acrylamides (such as N-tert-butyl acrylamide or N-cyclohexyl acrylamide); methacrylamides; and acrylonitrile derivatives. Further, in order to provide lubrication and stain resistance, it is preferable to introduce a polyorganosiloxane skeleton and a perfluoropolyether skeleton into the fluorine containing copolymers. Such skeletons are formed via polymerization of polyorganosiloxane having a terminal group such as an acryl group, a methacryl group, a vinyl ether group, or a styryl group with the above monomers, polymerization of the above monomers with polyorgsanosiloxane having a radical generating group at the terminal or perfluoropolyether, or reaction of polyorganosiloxane having a functional group at the terminal or perfluoropolyether.

The used ratio of each of the above monomers employed to from the fluorine containing copolymers prior to crosslinking is preferably 20-70 mol % with respect to the fluorine containing vinyl monomers, but is more preferably 40-70 mol % and the used ratio of monomers to provide a crosslinking group is preferably 1-20 mil %, but is more preferably 5-20 mol %, while the ratio of simultaneously employed other monomers is preferably 10-70 mol %, but is more preferably 10-50 mol %.

It is possible to prepare fluorine containing copolymers via polymerization in the presence of radical polymerization initiators, employing methods such as solution polymerization, bulk polymerization, emulsion polymerization, or suspension polymerization.

Pre-crosslinking fluorine containing resins are commercially available. Examples of commercially available pre-crosslinking fluorine containing resins include SAITOP (produced by Asahi Glass Co.), TEFLON (registered trade name) AF (produced by DuPont), polyvinylidene fluoride, RUMIFRON (produced by Asahi Glass Co.), and OPSTAR (produced by JSR).

The Dynamic friction coefficient and the contact angle to water of the low refractive index layer composed of crosslinked fluorine containing resins are preferably in the range of 0.03-0.15 and 90-120 degrees, respectively.

<Additives>

If desired, it is possible to incorporate additives such as silane coupling agents or hardening agents in the low refractive index liquid coating composition. The silane coupling agents are the compounds represented by above Formula (2).

Specific examples include vinyltriethoxysilane, γ-methacryloxypropyltrimethoxysilane, γ-glycidoxypropyltrimethoxysilane, and 3-(2-aminoethylaminopropyl)trimethoxysilane.

Cited as hardening agents are organic acid metal salts such as sodium acetate or lithium acetate, of which sodium acetate is particularly preferred. The added amount to the silicon-alkoxysilane hydrolyzed solution is preferably in the range of about 0.1—about 1 part by weight with respect to 100 parts by weight of solids in the hydrolyzed solution.

Further, it is preferable to add, to the low refractive index layer employed in the present invention, various leveling agents, surface active agents, and low surface tension substances such as silicone oil.

Specific commercially available silicone oils include L-45, L-9300, FZ-3704, FZ-3703, FZ-3720, FZ-3786, FZ-3501, FZ-3504, FZ-3508, FZ-3805, FZ-3707, FZ-3710, FZ-3750, FZ-3760, FZ-3785, FZ-3785, and Y-7400 of Nippon Unicar Co., Ltd., as well as KF96L, KF96, KF96H, KF99, KF54, KF965, KF968, KF56, KF995, KF351, KF352, KF353, KF354, KF355, KF615, KF618, KF945, KF6004, and FL100 of Shin-Etsu Chemical Co., Ltd.

These components enhance coatability onto a substrate or a lower layer. When incorporated in the uppermost layer of the multicoated layers, water- and oil-repellency, and anti-staining are enhanced and in addition, abrasion resistance of the surface is also enhanced. Since the excessive addition of these components results in repellency during coating, the added amount is preferably in the range of 0.01-3% by weight with respect to the solids in the liquid coating composition.

<Solvents>

Solvents employed in the liquid coating composition during coating the low refractive index layer include alcohols such as methanol, ethanol, 1-propanol, 2-propanol, or butanol; ketones such as acetone, methyl ethyl ketone, or cyclohexanone; aromatic hydrocarbons such as benzene, toluene, or xylene; glycols such as ethylene glycol, propylene glycol, or hexylene glycol; glycol ethers such as ethyl cellosolve, butyl cellosolve, ethyl CARBITOL, butyl CARBITOL, diethyl cellosolve, diethyl CARBITOL, or propylene glycol monomethyl ether; N-methylpyrrolidone, dimethylformamide, methyl lactate, ethyl lactate, methyl acetate, and water. These may be employed individually or in combinations of at least two types.

<Coating Methods>

The low refractive index layer is coated employing the methods known in the art, such as dipping, spin coating, knife coating, bar coating, air doctor coating, curtain coating, spray costing, or die coating, as well as ink-jet methods known in the art. Coating methods which enable continuous coating and thin layer coating are preferably employed. The coated amount is commonly 0.1-30 μm in term of wet thickness, but is preferably 0.5-15 μm. The coating rate is preferably 10-80 μm/minute.

When the composition of the present invention is applied onto a substrate, it is possible to control layer thickness and coating uniformity by regulating the solid concentration in the liquid coating composition and the coated amount.

In the present invention, it is also preferable to form an antireflection layer composed of a plurality of layers in such a manner that the medium refractive index layer and high refractive index layer, described below, are provided.

The configuration example of the antireflection layer usable in the present invention is described below, however the antireflection layer is not limited thereto.

Cellulose ester film/hard coat layer/low refractive index layer

Cellulose ester film/hard coat layer/medium refractive index layer/low refractive index layer Cellulose ester film/hard coat layer/high refractive index layer/low refractive index layer Cellulose ester film/hard coat layer/medium refractive index layer/high refractive index layer/low refractive index layer Cellulose ester film/antistatic layer/hard coat layer/medium refractive index layer/high refractive index layer/low refractive index layer Cellulose ester film/hard coat layer/antistatic layer/medium refractive index layer/high refractive index layer/low refractive index layer Antistatic layer/cellulose ester film/hard coat layer/medium refractive index layer/high refractive index layer/low refractive index layer Cellulose ester film/hard coat layer/high refractive index layer/low refractive index layer/high refractive index layer/low refractive index layer (Medium Refractive Index Layer and High Refractive Index Layer)

The constituting components of the medium and high refractive index layers are not particularly limited as long as the specified refractive index layer is prepared. However, it is preferable that the above layer is composed of the following metal oxide particles at a high refractive index, and binders. Other additives may be incorporated. The refractive index of the medium refractive index layer is preferably 1.55-1.75, while that of the high refractive index layer is preferably 1.75-2.20. The thickness of the high and medium refractive index layers is preferably 5 nm-1 μm, is more preferably 10 nm-0.2 μm, but is most preferably 30 nm-0.1 μm. It is possible to coat those layers employing the same coating method as that of the above low refractive index layer.

<Metal Oxide Particles>

Metal oxide particles are not particularly limited. For example, employed as a main component may be titanium dioxide, aluminum oxide (alumina), zirconium oxide (zirconia), zinc oxide, antimony-doped tin oxide (ATO), antimony pentaoxide, indium-tin oxide (ITO), and iron oxide, which may be blended. In the case of use of titanium dioxide, in term of retardation of activity of photocatalysts, it is preferably to employ core/shell structured metal oxide particles which are prepared in such a manner that titanium oxide is employed as a core and the core is covered with a shell composed of alumina, silica, zirconia, ATO, ITO, or antimony pentaoxide.

The refractive index of metal oxide particles is preferably 1.80-2.60, but is more preferably 1.90-2.50. The average diameter of the primary particles of the metal oxide particles is preferably 5 nm-200 nm, but is more preferably 10-150 nm. When the particle diameter is excessively small, metal oxide particles tend to aggregate to degrade dispersibility, while when it is excessively large, haze is undesirably increased. Inorganic particles are preferably in the form of rice grain, needle, sphere, cube, or spindle, or amorphous.

Metal oxide particles may be surface-treated with organic compounds. Examples of such organic compounds include polyol, alkanolamine, stearic acid, silane coupling agents, and titanate coupling agents. Of these, most preferred are silane coupling agents, described below. At least two types of surface treatments may be combined.

It is possible to prepare high and medium refractive index layers exhibiting desired refractive indices via appropriate selection of the type of metal oxides and the addition ratio thereof.

<Binders>

Binders are incorporated to improve film forming properties and physical properties of a coating. Employed as such binders may, for example, be the aforesaid ionizing radiation curing type resins, acrylamide derivatives, multifunctional acrylates, acrylic resins, and methacrylic resins.

(Metal Compounds and Silane Coupling Agents)

Incorporated as other additives may be metal compounds and silane coupling agents, which may be employed as a binder.

Employed as the metal compounds may be the compounds represented by Formula (7) or chelate compounds thereof.

$$A_n MB_{x-n} \quad \text{Formula (7)}$$

wherein M represents a metal atom; A represents a hydrolysable functional group or a hydrocarbon group having a hydrolysable functional group; B represents a group of atoms, which covalently or ionically bonds metal M; x represent valence of metal atom M; and n represents an integer of not less than 2 and not more than x.

Examples of hydrolysable functional group A include an alkoxyl group, a halogen atom such as a chorine atom, an ester group, and an amido group. Preferred as the compounds represented by above Formula (4) are alkoxides having at least two alkoxyl groups bonding a metal atom, or chelate compounds thereof. In view of refractive index, reinforcing effects of coating strength, and ease of handling, cited as preferred metal compounds are titanium alkoxides, zirconium alkoxides, and silicon alkoxides, or chelate compounds thereof. Titanium alkoxides exhibits a high reaction rate, a high refractive index, and ease of handling. However, its excessive addition degrades lightfastness due to its photocatalytic action. Zirconium akloxides exhibit a high refractive index, but tends to result in cloudiness, whereby careful dew point management is required during coating. On the other hand, silicon alkoxides exhibit a low reaction rate and a low refractive index, but ease of excellent handling and excellent lightfastness. Silane coupling agents can react with both inorganic particles and organic polymers, whereby it is possible to prepare a strong coating. Further, titanium aloxides enhance reaction with ultraviolet radiation curing resins and metal alkoxides, whereby it is possible to enhance physical characteristics of a coating even by a small amount of their addition.

Examples of titanium alkoxides include tetramethoxytitaium, tetraethoxytitanium, tetra-iso-propoxytitanium, tetra-n-propoxytitanium, tetr-n-butoxytitanium, tetra-sec-butoxytitanium, and tetra-tert-butoxytitanium.

Examples of zirconium alkoxides include tetramethoxyzirconium, tetraethoxyzirconium, tetra-iso-propoxyzirconium, tetra-n-proxyzirconium, tetra-n-butoxyzirconium, tetra-sec-butoxyzirconium, and tetra-tert-butoxyzirconium.

Silicon alkoxides and silane coupling agents are the compounds represented by following Formula (8).

$$R_m Si(OR')_n \quad \text{Formula (8)}$$

wherein R represents a reactive group such as an alkyl group (preferably an alkyl group having 1-10 carbon atoms), a vinyl group, a (meth)acryloyl group, an epoxy group, an amido group, a sulfonyl group, a hydroxyl group, a carboxyl group, or an alkoxyl group, R' represents an alkyl group (preferably an alkyl group having 1-10 carbon atoms), and m+n is 4.

Specifically cited are tetramethoxysilane, tetraethoxysilane, tetra-iso-propoxysilane, tetra-n-propoxysilane, tetra-n-butoxysilane, tetra-sec-butoxysilane, tetra-tert-butoxysilane, terapentaethoxysilane, methyltrimethoxysilane, methyltriethoxysilane, methyltriproxysilane, methyltributoxysilane, dimethyldimethoxysilane, dimethyldiethoxysilane, hexyltrimethoxysilane, vinyltriethoxysilane, γ-methacryloxypropyltrimethoxysilane, γ-glycidoxypropyltrimethoxysilane, and 3-(2-aminoethylaminopropyl)trimethoxysilane.

Cited as preferred chelating agents which are allowed to coordinate with a free metal compound to form a chelate compound may be alkanolamines such as diethanolamine or triethanolamine; glycols such acetylene glycol, diethylene glycol, or propylene glycol; and acetylacetone, ethyl acetacetate, having a molecular weight of at most 100,000. By employing such chelating agents, it is possible to prepare chelate compounds which are stable for water mixing and exhibit excellent coating strengthening effects.

In the medium refractive index composition, the added amount of the metal compounds is preferably less than 5% by weight in terms of metal oxides, while in the high refractive index composition, the same is preferably less than 20% by weight in terms of metal oxides.

(Polarizing Plate)

The polarizing plate of the present invention will now be explained.

The cellulose ester film of the present invention is preferably employed as a polarizing plate protective film provided on at least one surface of a polarizer where the cellulose ester film of the present invention is preferably provided the cell side surface of the polarizer. The cellulose ester film of the present invention may be provided on both surfaces of the polarizer.

It is possible to prepare a polarizing plate employing a common method. It is preferable that the reverse side of the cellulose ester film of the present invention is subjected to an alkali saponification treatment and the resulting cellulose ester film is adhered, employing an aqueous solution of completely-saponified polyvinyl alcohol, onto at least one surface of a polarizer which has been prepared by being immersed into an iodine solution followed by stretching. Further, the above polyvinyl alcohol film is preferably an ethnically modified polyvinyl alcohol film.

The cellulose ester film of the present invention or another polarizing plate protective film may be employed on the other surface of the above mentioned polarizer. Employed as a polarizing plate protective film used on the other surface, in place of the cellulose ester film of the present invention, may be commercially available cellulose ester film. Examples of a preferably employable commercially available cellulose ester film include: 8UX, 8UY, 4UX, 4UY, 5UN, and KC8UX-RHA (all produced by Konica Minolta Opto, Inc.). By using the cellulose ester film of the present invention in combination, obtained is a polarizing plate exhibiting excellent visibility, excellent flatness and a stable viewing angle enlarging effect.

(Ethylenically Modified Polyvinyl Alcohol)

In the present invention, a stretched and dyed ethylenically modified polyvinyl alcohol is preferably used as a polarizer. More preferable is to use an ethylenically modified polyvinyl alcohol having an ethylene unit content of 1-4 mol %, a degree of polymerization of 2,000 and a saponification ratio of 99.0-99.99 mol %, and specifically preferable is to use an ethylenically modified polyvinyl alcohol film of which the hot-water cutting temperature is 66-73° C. Further, in order to decrease color macules, it is more preferable that the difference of the hot water cutting temperature between two points 5 cm apart in the TD direction is at most 0.5° C.

Further, in order to decrease color mucules, it is particularly preferable that the film thickness is 5-20 μm.

A polarizer employing the ethylenically modified polyvinyl alcohol film exhibits excellent polarizing performance and durability as well as decreases color macules and is preferably applied in a large screen in-plane switching mode liquid crystal display.

Employed as the ethylenically modified polyvinyl alcohol (being the ethylenically modified PVA) may be those which are prepared in such a manner that ethylene-vinyl ester based polymers, prepared by copolymerizing ethylene and vinyl ester based monomers, are saponified in which vinyl ester units are employed as vinyl alcohol units. Examples of the above vinyl ester based monomers include vinyl formate, vinyl acetate, vinyl propionate, vinyl valerate, vinyl laurate, vinyl stearate, vinyl benzoate, vinyl pivaliate, and versatic acid vinyl esters. Of these, it is preferable to employ vinyl acetate.

The ethylene unit content (being the copolymerized amount of ethylene) in the ethylenically modified PVA is 1-4 mol %, however, is preferably 1.5-3 mol % and is more preferably 2-3 mol %.

The content of the ethylene units in the above described range is preferable since the polarizablity and the durability are improved and color macules are reduced.

Further, the ethylenically modified polyvinyl alcohol may be prepared by copolymerizing a monomer, for example, described below with the vinyl ester based monomer. The content of such a monomer is preferably not more than 15 mol % and more preferably not more than 5 mol %.

Examples of such a copolymerizable monomer with the vinyl ester based monomer include: olefins having 3-30 carbon atoms such as propylene, 1-butene, or isobutene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid and salts thereof; methacrylic acid esters such as methyl methacrylate, ethyl methacrylate, n-propyl methacrylate, i-propyl methacrylate, n-butyl acrylate, i-butyl acrylate, t-butyl acrylate, 2-ethylhexyl methacrylate, dodecyl methacrylate, or octadecyl methacrylate; acrylamide derivatives such as acrylamide, N-methylacrylamide, N-ethylacrylamide, N,N-dimethylacrylamide, diacetoneacrylamide, acrylamide propane sulfinic acid and salts thereof, acrylamidopropyldimethylanine and salts thereof, N-methylol acrylamide and derivatives thereof; methacrylamide derivatives such as methacrylamide, N-methylmethacrylamide, N-ethylmethacrylamide, methacrylamidopropane sulfonic acid and salts thereof, methacrylamidopropyldimethylamine and salts thereof, or N-methylol methacrylamide and derivatives thereof; N-vinylamides such as N-vinylformamide, N-vinylacetamide, or n-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; nitrites such as acrylonitrile or methacrylonitrile; halogenated vinyls such as vinyl chloride, vinylidene chloride, vinyl fluoride, or vinylidene fluoride; allyl compounds such as allyl acetate or allyl chloride; maleic acid, and salts and esters thereof; itaconic acid, and salts and esters thereof; vinylsilyl compounds such as vinylmethoxysilane; and N-vinylamides such as isopropenyl acetate, N-vinylformamide, N-vinylacetamide, or N-vinylpyrrolidone.

The degree of polymerization of ethylenically modified PVA is 2,000, preferably 2,500, and more preferably 2,000 in terms of polarizing performance and durability. When the degree of polymerization of ethylenically modified PVA is less than 2,000, the polarizing performance and durability of the polarizer are undesirably degraded. The degree of polymerization of 4,000 or less is preferred since color macules of the polarizer tend not to occur.

The degree of polymerization of the ethylenically modified PVA is a weight average polymerization degree determined by means of GPC (Gel Permeation Chromatography). This weight average polymerization degree is a value obtained by performing GPC measurement at 40° C. employing hexafluoroisopropanol (HFIP) added with 20 millimol/liter of sodium trifluoroacetate as the mobile phase using monodispersed PMMA as a standard.

In view of polarization performance and durability of the polarizer, the ratio of saponification of the ethylenically modified PVA constituting the polarizer is preferably 99.0-99.99 mol %, is more preferably 99.9-99.99 mol %, but is most preferably 99.95-99.99 mol %.

The method to produce an ethylenically modified PVA film is not specifically limited, however, preferable are a casting method and a melt extrusion method, in order to obtain a preferable ethylenically modified PVA film. The obtained ethylenically modified PVA film is dried and is subjected to a thermal treatment, if necessary.

Cited as solvents to dissolve the ethylenically modified PVA employed during production of ethylenically modified PVA film may, for example, be dimethylsulfoxide, dimethylformamide, dimethylacetamide, N-methylpyrrolidone, ethylene glycol, glycerin, propylene glycol, triethylene glycol, tetraethylene glycol, trimethylolpropane, ethylenediamine, diethylenetriamine, and water. These may be employed individually or in combination of at least two types. Of these, suitably employed is dimethylsulfoxide and water, or a mixed solvent of glycerin and water.

The ratio of ethylenically modified PVA, incorporated in an ethylenically modified PVA solution or water-containing ethylenically modified PVA employed during production of the ethylenically modified film, varies depending on the degree of polymerization of the ethylenically modified PVA, but is commonly 20-70% by weight, is preferably 25-60% by weight, but is more preferably appropriately 30-55% by weight, but is most preferably 35-50 by weight. When the ratio of the ethylenically modified PVA exceeds 70% by weight, viscosity of the ethylenically modified PVA solution or the water-containing ethylenically modified PVA becomes excessively high, whereby it becomes difficult to prepare a film without foreign matter and defects due to difficult filtration and defoaming. On the other hand, when the ratio of the ethylenically modified PVA is at most 20% by weight, the viscosity of the ethylenically modified PVA solution or the water-containing ethylenically modified PVA becomes excessively low, whereby it becomes difficult to prepare a PVA film at the targeted thickness. Further, if desired, plasticizers, surface active agents, and dichroic dyes may be incorporated in the above ethylenically modified PVA solution or water-containing ethylenically modified PVA.

During production of the ethylenically modified PVA film, it is preferable to incorporate polyhydric alcohols as a plasticizer. Examples of polyhydric alcohols include ethylene glycol, glycerin, propylene glycol, diethylene glycol, diglycerin, triethylene glycol, tetraethylene glycol, and trimethylolpropane. These may be employed individually or in combinations of at least two types. Of these, in view of orientation enhancement effects, diglycerin, ethylene glycol, and glycerin are preferable.

The added amount of polyhydric alcohols is preferably 1-30 parts by weight with respect to 100 parts by weight of the ethylenically modified PVA, is more preferably 3-25 parts by weight, but is most preferably 5-20 parts by weight. When the added amount is at most 1 part by weight, dying properties and orientation properties are occasionally degraded, while when it exceeds 30 parts by weight, the ethylenically modified film becomes excessively flexible, whereby handling properties tend to be degraded.

During production of the ethylenically modified PVA film, it is preferable to incorporate surface active agents. The types of surface active agents are not particularly limited, but nonionic or cationic surface active agents are preferred. Examples of suitable anionic surface active agents include carboxylic acid types such as potassium laurate, sulfuric acid ester types such as octyl sulfate, and sulfonic acid types such as dodecylbenznene sulfonate. Examples of suitable nonionic surface active agents include alkyl ether types such as polyoxyethylene oleyl ether; alkyl phenyl ether types such as polyoxyethylene octyl phenyl ether; alkyl ester types such as polyoxyethylenelaurate; alkylamine types such as polyoxyethylene lauryl aminoether; alkylamide types such as polyoxyethylene lauric acid amide; polypropylene glycol ether types such as polyoxyethylene polyoxypropylene ether; alkanol amide types such as oleic acid diethanolamide; and allyl phenyl ether types such as polyoxyalkylene phenyl ether. These surface active agents may be employed individually or in combinations of at least two types.

The added amount of surface active agents is preferably 0.01-1 part by weight with respect to 100 parts by weight of the ethylenically modified PVA and is more preferably 0.02-0.5 part by weight. When the added amount is at most 0.01 part by weight, effects to improve film casting properties and peeling properties are hardly exhibited, while when it exceeds 1 part by weight, surface active agents are dissolved out onto the surface of the ethylenically modified PVA film to result in blocking, whereby handling properties tend to be degraded.

The thickness of the ethylenically modified PVA film employed to prepare a polarizer is preferably 10-50 µm, but is more preferably 20-40 µm. When the thickness is at most 10 µm, uniform stretching is hardly performed due to excessively low film strength, whereby color macules of the polarizer tend to be generated. On the other hand, when the thickness exceeds 50 µm, during production of a polarizer via uniaxial orientation of the ethylenically modified PVA film, the thickness tends to vary due to neck-in at the ends, whereby color macules of the polarizer tend to be undesirably enhanced.

Further, to produce a polarizer employing an ethylenically modified PVA film, for example, the ethylenically modified PVA film may be dyed, uniaxially stretched, fixed and dried, if desired, thermally treated. The order of the dying, uniaxial stretching, and fixing is not particularly limited. Further, the uniaxial stretching may be repeated twice or more.

Dying may be performed at any time such as prior to uniaxial stretching, during uniaxial stretching, or after uniaxial stretching. Employed as dyes for dying are dichroic dyes. These may be employed singly or in combinations of at least two types. Dying is commonly performed by immersing a PVA film into a solution incorporating the above dyes. Alternatively, the above dyes may be blended into a PVA film during casting. The above dying conditions and methods are not particularly limited.

It is possible to conduct uniaxial stretching employing either a wet stretching method or a dry heat stretching method, and in heated water (a solution incorporating the above dyes or the fixing bath, described below, may be employed) or in an atmosphere employing the ethylenically modified PVA film after water absorption. The temperature during stretching is not particularly limited. When the ethylenically modified PVA film is stretched in heated water (being wet system stretching), the stretching temperature is preferably 30-90° C., while in the case of dry heat stretching, it is preferably 50-180° C. The stretching factor (the total stretching factor in the case of multistage uniaxial stretching) is preferably at least 4 in terms of polarization performance of a polarizing film, but is most preferably at least 5. The upper limit of the stretching factor is not particularly limited. However, the stretching factor is preferably at least 8, since uniform stretching is readily performed. The film thickness after stretching is preferably 2-20 µm, but is more preferably 5-15 µm.

To strengthen adsorption of the above dyes onto the ethylenically modified PVA film, a fixing treatment is frequently conducted. Commonly, boric acid and/or boron compounds are added to a treatment bath employed for the fixing treatment. Alternatively, if desired, iodine compounds may be incorporated in the treatment bath.

Drying of a prepared polarizer is preferably performed between 30-150° C., but is more preferably performed between 50-150° C.

An polarizing plate protective layer is adhered to one surface or both surfaces of the polarizer, whereby a polarizing plate is prepared. Listed as adhesives for the above adhesion may be a PVA based adhesive and an urethane based adhesive. Of these, the PVA based adhesive is preferable.

The polarizing film as a major constituent of the polarizing plate is an element that permits passage of only the light in one polarizing plane. The currently known typical polarizing film is a polyvinyl alcohol based polarizing film. The polyvinyl alcohol based film dyed by iodine and that dyed by dichromatic dyes are available. The polarizing film to be used is produced as follows: The aqueous solution of polyvinyl alcohol is used to form a film, which is dyed and is uniaxially stretched. Alternatively, the film is uniaxially stretched and then dyed. Thus obtained polarizing film is preferably subjected to durability treatment using a boric acid compound. The cellulose ester film of the present invention is adhered on a surface of the polarizing film to form a polarizing plate. The adhesion is preferably carried out using an aqueous adhesive containing, for example, a fully-saponified polyvinyl alcohol as a main component.

The polarizing plate using a conventional cellulose ester film was lacking in flatness and wavy unevenness was observed in a reflected image. The wavy unevenness increased when the polarizing plate was subjected to a durability test under a condition of 60° C. and 90% RH. On the contrary, the polarizing plate using a cellulose ester film of the present invention showed excellent flatness and wavy unevenness did not increase even after a durability test under a condition of 60° C. and 90% RH.

The polarizing plate employing the cellulose ester film of the present invention was found to be excellent in flexibility and formed less cutting scrap when the film was cut, resulting in reducing defect due to the cutting scrap and being excellent for manufacturing.

(Liquid Crystal Display)

By mounting the polarizing plate of the present invention on a display device, it is possible to prepare various types of liquid crystal display of the present invention exhibiting excellent visibility. The cellulose ester film of the present invention is preferably employed in a reflection LCD, a transmissive LCD, or semi-transmissive LCD, as well as in various driving mode LCDs such as a TN mode LCD, an STN mode LCD, an OCB mode LCD, an HAN mode LCD, a VA mode LCD (including a PVA mode LCD and an MVA mode LCD), or an IPS mode LCD, however, specifically preferable is to be used in an in-plane switching mode LCD such as an IPS mode LCD or a FFS mode LCD. Further, in a large screen liquid crystal display of 17 size or more, or specifically 30 size or more, in addition to the effect of the present invention, an effect of preventing eye fatigue even after a long time observation was obtained, since no distortion was observed in the image reflected by the screen, which was just like an image reflected by a mirror surface, while distortion had been observed in the image of a fluorescent lamp reflected by a conventional LCD screen due to color unevenness or wavy unevenness.

EXAMPLES

The present invention is described below referring examples but the present invention is not limited to the examples. "Percent" in the examples is "percent by weight" as long as any specific description is not attached.

Example (Synthesis of Acryl Polymer)

Cluster polymerization was carried out according to the polymerization method described in JP-A No. 2000-344823. In a flask having a stirrer, a nitrogen gas inlet tube, a thermometer, an opening for putting in material and a reflux condenser, the following methyl methacrylate and ruthenocene were introduced while heating the content of the flask at 70° C. After that, a half of the following β-mercaptopropionic acid which was sufficiently subjected to gas replacing treatment by nitrogen gas was added into the flask while stirring. After adding the β-mercaptopropionic acid, the content of the flask was stirred at 70° C. for 2 hours for carrying out polymerization. Then the remaining half of the β-mercaptopropionic acid atmosphere being substituted with nitrogen gas was further added and the temperature was kept at 70° C. for continuing the polymerization for 4 hours while stirring. Then the temperature of the reaction product was cooled to ambient temperature and 20 parts by weight of a 5 weight % tetrahydrofuran solution of benzoquinone for stopping the polymerization. The polymerized product was gradually heated to 80° C. under reduced pressure in an evaporator for removing tetrahydrofuran, remaining monomer and remaining thiol compound. Thus Acryl Polymer H5 was obtained. The weight average molecular weight of the polymer was 1,000.

(Preparation of Polyester K1)

In a three necked flask, a stirrer, a nitrogen gas inlet tube, a thermometer and a water remover tube were mounted. The water remover tube had a fractional tube. At the end of the fractional tube, a condenser tube having a thermometer on the top was equipped. A water receiver having a scale (ml) was provided beneath the condenser, the water receiver also having a exhaust tube on the top. In the flask, 186 g of ethylene glycol and 236 g of succinic acid were charged and the inside of the flask was heated to 80 to 90° C. while slowly passing nitrogen gas and then stirring was started. The temperature was increased to 150-160° C. over 1 hour while keeping the temperature of the top of the condenser at 100° C. or less in order to remove only water and not to let glycol out. Then the temperature was increased to 190-200° C. until 72 g water came out and then the inside temperature was lowered to 110-120° C. After adding 120 g of acetic acid, the temperature was increased again to 150-160° C. When 36 g of water was further came out, the inside temperature was lowered to 110-120° C. subsequently to 80° C. The reaction product was deposited using acetone and separated by filtering to obtain polyester K1. The weight average molecular weight of K1 was determined to be 434 by means of GPC.

(Polymerization of K2 to 11)

Each of K2 to 11 was prepared according to the same manner as K1: a combination of a dihydric alcohol and a dibasic carboxylic acid shown in Table 1-Table 2 was charged and heated while stirring. After water came out, the temperature was lowered to add a monoalcohol or a monocarboxylic acid listed in Table 1-Table 2, and the temperature was increased again while stirring. After water further came out, the inside temperature was lowered and the reaction product was deposited using acetone followed by separation by filtering. Thus K2 to 11 were obtained. The molecular weight of the product was controlled by varying the amount of water came out. For K5 and K7, the each mixing ratio of two kinds of alcohols to two kinds of carboxylic acids was set to 1:1. The weight average molecular weights of the obtained polymers are shown below. The figures in the parentheses represent the weight average molecular weights: K2(800), K3(234), K4(3000), K5(6000), K6(10000), K7(11000), K8(234), K9(1000), K10(8000), K11(10000).

(Polymerization of H4)

H4 was prepared in the same manner as K1-K11 except that the reaction was stopped after first water came out. The product was deposited by acetone. The weight average molecular weight was 800.

| | |
|---|---|
| Methyl methacrylate | 100 parts by weight |
| Ruthenocene (metallic catalyst) | 0.05 parts by weight |
| β-mercaptopropionic acid | 12 parts by weight |

Besides, Acryl Polymers AC 1 through 8 were synthesized by referring the method described in JP-A No. 2003-12859.

(Preparation of Cellulose Ester Film 1)

| (Dope composition) | |
|---|---|
| Cellulose triacetate S1 (acetyl substitution degree 0.46, propionyl substitution degree 2.52) | 100 parts by weight |
| 2-(2'-hydroxy-3',5'-di-t-butylphenyl)benzotriazole | 2 parts by weight |
| K1 (a kind of compound represented by Formula (1) wherein $B_1$ represents a monocarboxylic acid having 1 - 12 carbon atoms, G represents a dihydric alcohol having 2 - 12 carbon atoms and A represents a dibasic acid having 2 - 12 carbon atoms) | 30 parts by weight |
| Methylene chloride | 475 parts by weight |
| Ethanol | 50 parts by weight |

The dope composition was put into a closed vessel and heated by 70° C. and the cellulose triacetate was completely dissolved by stirring to form a dope. The time for dissolving was 4 hours. The dope composition was filtered and uniformly cast on a stainless steel band support of 22° C. at a dope temperature of 35° C. using a belt casting apparatus.

The cast dope was dried into the peelable range and peeled off from the stainless band support. The amount of remaining solvent in the dope was 25% at this time. The time necessary from the dope casting to the peeling was 3 minutes. After peeling from the stainless steel band support, the film was dried at 120° C. while stretching by 1.01 times in the width direction by a tenter. After that the film was released from the width holding and dried at 120° C. while conveying many rollers and further dried in a drying zone at 135° C. for finishing the drying. A knurling treatment with a width of 10 mm and height of 5 μm was applied on the both edges of the film. Thus cellulose ester film having a thickness of 40 μm was prepared. The width and length of the film were 1,300 mm and 3,000 m, respectively. The initial and final winding up tensions were 150 N/1,300 mm and 100 N/1,300 mm, respectively.

(Preparation of Cellulose Ester Films 2 through 37)

Cellulose Ester Films 2 through 37 were prepared in the same manner as Cellulose Ester Film 1 except that K1 and its adding amount were changed to the polyester and the amount thereof listed in Table 5 and the acryl polymer listed in Table 5 was added to a part of the films and the thickness was changed as listed in Table 5. In Table 5, AC1 to AC8 are described in Table 3 and H1 to H5 are described in Table 4.

(Preparation of Cellulose Ester Films 38 and 39)

Cellulose Ester Films 38 and 39 were prepared in the same manner as Cellulose Ester Film 1 except that S2 (acetyl substitution degree of 1.9 and propionyl substitution degree of 1.0) and S3 (acetyl substitution degree of 1.9 and propionyl substitution degree of 1.08), respectively, were used instead of S1.

TABLE 1

$B_1$-(G-A)$_m$-G-$B_1$

| Compound No. | $B_1$ | G | A | Mw |
|---|---|---|---|---|
| K1 | $CH_3COO$ | $C_2H_4$—O | CO—$C_2H_4$—COO | 434 |
| K2 | $CH_3COO$ | $C_2H_4$—O | CO—$C_2H_4$—COO | 800 |
| K3 | HCOO | $C_2H_4$—O | CO—COO | 234 |
| K4 | $C_7H_{15}COO$ | $C_2H_4$—O | CO—$C_2H_4$—COO | 3000 |
| K5 | $CH_3COO$ | $C_2H_4$—O$^{1)}$ $C_4H_8$—O$^{1)}$ | CO—$C_2H_4$—COO$^{2)}$ CO—$C_4H_8$—COO$^{2)}$ | 6000 |
| K6 | $C_{11}H_{23}COO$ | $C_{12}H_{24}$—O | CO—$C_{10}H_{20}$—COO | 10000 |
| K7 | $C_{11}H_{23}COO$ | $C_2H_4$—O$^{3)}$ $C_{12}H_{24}$—O$^{3)}$ | CO—$C_2H_4$—COO$^{4)}$ CO—$C_{10}H_{20}$—COO$^{4)}$ | 11000 |

$^{1)-4)}$Mixing Ratio 1:1

TABLE 2

$B_2$-(A-G)$_n$-A-$B_2$

| Compound No. | $B_2$ | A | G | Mw |
|---|---|---|---|---|
| K8 | $CH_3O$ | CO—COO | $C_2H_4$—O | 234 |
| K9 | $C_2H_5O$ | CO—$C_2H_4$—COO | $C_2H_4$—O | 1000 |
| K10 | $C_2H_5O$ | CO—COO | $C_4H_8$—O | 8000 |
| K11 | $C_2H_5O$ | CO—COO | $C_2H_4$—O | 10000 |

TABLE 3

(HEA)$_X$-(MMA)$_Y$

| Compound No. | X | Y | Mw |
|---|---|---|---|
| AC1 | 1 | 99 | 3000 |
| AC2 | 5 | 95 | 4000 |
| AC3 | 10 | 90 | 8000 |
| AC4 | 20 | 80 | 12000 |
| AC5 | 40 | 60 | 18000 |
| AC6 | 50 | 50 | 20000 |
| AC7 | 40 | 60 | 18000 |
| AC8 | 50 | 50 | 20000 |

TABLE 4

| Compound No. | $B_1$ | G | A | Mw |
|---|---|---|---|---|
| | $B_1$-(G-A)$_m$-G-$B_1$ | | | |
| H1 | $CH_3COO$ | p-$C_6H_4$—O | CO—$C_2H_4$—COO | 800 |
| H2 | $CH_3COO$ | $C_2H_4$—O | CO—$C_6H_4$—COO | 800 |
| H3 | $C_6H_5COO$ | $C_2H_4$—O | CO—$C_2H_4$—COO | 800 |
| H4 | OH | $C_2H_4$—O | CO—$C_2H_4$—COO | 800 |
| | Acryl Polymer | | | |
| H5 | | PMMA | | 1000 |

MMA: Methyl methacrylate
HEA: 2-hydroxyethyl acrylate

TABLE 5

| *1 | Cellulose triacetate | Polyester Compound | *2 | Acryl polymer Compound | *2 | Thickness (μm) | Flatness | Rt (nm) | Ro (nm) |
|---|---|---|---|---|---|---|---|---|---|
| 1 | S1 | K3 | 30 | — | — | 40 | A | −20 | 2 |
| 2 | S1 | K1 | 20 | — | — | 40 | A | −10 | 1 |
| 3 | S1 | K1 | 15 | — | — | 40 | A | −5 | 0 |
| 4 | S1 | K1 | 15 | — | — | 80 | A | −5 | 0 |
| 5 | S1 | K2 | 10 | — | — | 40 | A | 0 | 0 |
| 6 | S1 | K4 | 10 | — | — | 50 | A | 0 | 0 |
| 7 | S1 | K5 | 10 | — | — | 40 | A | 0 | 0 |
| 8 | S1 | K6 | 5 | — | — | 40 | A | 5 | 0 |
| 9 | S1 | K7 | 5 | — | — | 40 | A | 5 | 0 |
| 10 | S1 | K8 | 15 | — | — | 40 | A | −5 | 0 |
| 11 | S1 | K9 | 15 | — | — | 80 | A | −5 | 0 |
| 12 | S1 | K10 | 15 | — | — | 80 | A | −5 | 0 |
| 13 | S1 | K11 | 10 | — | — | 20 | B | 0 | 0 |
| 14 | S1 | K11 | 10 | — | — | 40 | A | 0 | 0 |
| 15 | S1 | K11 | 10 | — | — | 80 | A | 0 | 0 |
| 16 | S1 | K1 | 10 | AC1 | 10 | 40 | A | −10 | 1 |
| 17 | S1 | K1 | 10 | AC2 | 1 | 50 | A | 0 | 0 |
| 18 | S1 | K1 | 15 | AC3 | 5 | 40 | A | −10 | 1 |
| 19 | S1 | K1 | 5 | AC3 | 20 | 40 | A | −15 | 2 |
| 20 | S1 | K1 | 10 | AC4 | 10 | 40 | A | −10 | 1 |
| 21 | S1 | K1 | 5 | AC4 | 15 | 40 | A | −10 | 1 |
| 22 | S1 | K1 | 10 | AC5 | 10 | 40 | A | −10 | 1 |
| 23 | S1 | K1 | 2 | AC6 | 10 | 80 | A | 5 | 0 |
| 24 | S1 | K1 | 10 | AC7 | 10 | 40 | A | −10 | 1 |

TABLE 5-continued

| *1 | Cellulose triacetate | Polyester Compound | *2 | Acryl polymer Compound | *2 | Thickness (μm) | Flatness | Rt (nm) | Ro (nm) |
|---|---|---|---|---|---|---|---|---|---|
| 25 | S1 | K1 | 10 | AC8 | 10 | 40 | A | −10 | 1 |
| 26 | S1 | H1 | 20 | — | — | 80 | D | 25 | 5 |
| 27 | S1 | H2 | 20 | — | — | 80 | D | 25 | 5 |
| 28 | S1 | H3 | 20 | — | — | 80 | D | 30 | 5 |
| 29 | S1 | H5 | 10 | — | — | 40 | A | 0 | 0 |
| 30 | S1 | H5 | 20 | — | — | 80 | A | −5 | 0 |
| 31 | S1 | K1 | 15 | — | — | 40 | A | −5 | 0 |
| 32 | S1 | K1 | 15 | — | — | 80 | A | −5 | 0 |
| 33 | S1 | K1 | 10 | AC4 | 10 | 40 | A | −10 | 1 |
| 34 | S1 | H5 | 10 | — | — | 40 | A | 0 | 0 |
| 35 | S1 | K1 | 15 | — | — | 80 | A | −5 | 0 |
| 36 | S1 | H4 | 20 | — | — | 80 | B | −5 | 1 |
| 37 | S1 | H4 | 10 | — | — | 80 | B | 5 | 0 |
| 38 | S2 | K1 | 15 | — | — | 80 | A | −10 | 1 |
| 39 | S3 | K1 | 15 | — | — | 80 | A | −7 | 1 |

*1: Cellulose ester film No.,
*2: (Weight %)

(Preparation of Polarizer 1)

One hundred parts by weight of ethylenically modified polyvinyl alcohol having an ethylene content of 2.1 mol %, a saponification degree of 99.92 mol % and a polymerization degree of 3,000, was impregnated with 10 parts by weight of glycerin, and 200 parts by weight of water, and was molten, kneaded and defoamed, and then extruded through a T-die onto a metal roll and dried. Thus an ethylenically modified polyvinyl alcohol film having a thickness of 40 μm was obtained.

The obtained ethylenically modified polyvinyl alcohol film was subjected to treatments for preliminary swelling, dyeing, uniaxial stretching, fixing, drying and heating in this order to prepare Polarizer 1. Namely, the ethylenically modified polyvinyl alcohol film was immersed in water of 30° C. for 60 minutes for preliminary swelling, and immersed for 2 minutes in a 35° C. aqueous solution of 40 g/liter of boric acid, 0.4 g/liter of iodine and 60 g/liter of potassium iodide. Then the film was uniaxially stretched in a 4% boric acid aqueous solution of 55° C.; the stretching ratio was varied so that the film thickness became to 5 to 25 μm. After that the film was subjected to a fixing treatment by immersing for 5 minutes into a 30° C. aqueous solution of 60 g/liter of potassium iodide, 40 g/liter of boric acid and 10 g/liter of zinc chloride. The film was taken out and dried by 40° C. hot air at ordinary humidity and thermally treated for 5 minutes at 100° C.

The transmittance and polarization degree of thus obtained Polarizer were 43% and 99.9%, respectively.

(Preparation of Polarizer 2)

A polyvinyl alcohol film having a thickness of 120 μm was immersed in 100 parts by weight of an aqueous solution containing 1 part by weight of iodine and 4 parts by weight of boric acid and uniaxially stretched at 50° C. to prepare Polarizer 2. The stretching ratio was varied so that the film thickness became 20 to 25 μm.

(Polarizing Plates 1-30 and 36-39)

Cellulose Ester Films 1-30 each were treated with 2.5 mol/liter aqueous solution of sodium hydroxide at 40° C. for 60 seconds and washed by water for 3 minutes for forming a saponified layer. Each of the alkali-treated films was pasted on both sides of the above prepared Polarizer 1 by an adhesive of 5% aqueous solution of completely saponified polyvinyl alcohol. Thus Polarizing Plates 1-30 and 36-39 were prepared from Cellulose Ester Films 1-30 and 36-39, respectively.

(Preparation of Polarizing Plates 31 through 34)

Cellulose Ester Films 31-34 were each treated by 2.5 mol/liter aqueous solution of sodium hydroxide of 40° C. for 60 seconds and washed by water for 3 minutes for forming a saponified layer. Each of the alkali-treated films was pasted on both sides of the above prepared Polarizer 2 by an adhesive of 5% aqueous solution of completely saponified polyvinyl alcohol. Thus Polarizing plate 31 through 34 were prepared from Cellulose Ester Films 31 through 34, respectively.

(Preparation of Polarizing Plate 35)

The above Cellulose Ester Film 4 and KC8UX-RHA, manufactured by Konica Minolta Opto Inc., were each alkali-treated for 60 seconds at 40° C. by a 5 moles/liter sodium hydroxide aqueous solution to form a saponified layer. The alkali-treated films were each pasted on both sides of the above prepared Polarizer 1 by an adhesive of 5% aqueous solution of completely saponified polyvinyl alcohol to prepare Polarizing plate 35.

[Evaluation]

Thus obtained Cellulose Ester Films 1-39 were subjected to the following evaluation.

(Flatness)

Each of the samples was cut into a size of 90 cm×100 cm, and placed on a test table over which five 50 W fluorescent lamps were arranged in parallel so that the sample was illuminated from an angle of 45° by the fluorescent lamps, and the shape of the image of the lamps reflected by the film surface was visually observed and judged according to the followings criteria. The buckling and wrinkling can be evaluated by such the method.

A: The reflected images of the 5 fluorescent lamps were straight.

B: Some portions of the reflected images of the lamps were slightly waved.

C: Whole reflected images of the lamps were slightly waved.

D: The reflected images of the lamps were largely waved.

(Measurements of Ro and Rt)

The average refractive index of each of the cellulose ester films was measured by Abbe's refractometer (4T). The thickness of each of the films was measured by a micrometer available on the market.

The retardation of the film stood for 24 hours in the environment of 23° C. and 55% RH was measured at a wavelength of 590 nm by an automatic birefringence analyzer "KOBRA-21ADH, manufactured by Oji Scientific Instruments, in the same environment. The above measured average refractive index and the thickness were input to the following expressions for obtaining the in-plane retardation Ro and retardation in the thickness direction Rt.

$$Ro = (n_x - n_y) \times d \quad \text{Expression I}$$

$$Rt = \{(n_x + n_y)/2 - n_z\} \times d \quad \text{Expression ii}$$

In the expressions, $n_x$, $n_y$ and $n_z$ each represent a refractive index in the direction of the main axes x, y and z of the refractive index ellipsoid, respectively, and $n_x$ and $n_y$ are in-plane refractive indexes and $n_z$ is a refractive index in the thickness direction. The relationship $n_x \geq n_y$ is satisfied and d is the thickness (nm) of the film.

(Stability of Rt)

Rt of the cellulose ester film was measured after treating the film for 10 hours at 23° C. and 80% RH and the measurement of Rt was repeated after further treating the film for 10 hours at 23° C. and 20% RH. The results of the test were classified into 4 ranks according to the following criteria.

ΔRt (nm)=Rt (23° C. and 80% RH)−Rt (23° C. and 20% RH)

A: ΔRt was less than 10 nm.
B: ΔRt was 10 nm or more but less than 15 nm
C: ΔRt was 15 nm or more but less than 20 nm
D: ΔRt was not less than 20 nm Next, Polarizing plates 1 through 39-were evaluated as follows.

(Degradation of Polarizing Plate)

Each of the above prepared polarizing plates were treated for 120 hours at 80° C. and 90% RH and the transmittance of each plate was measured before and after the treatment and the results were evaluated in 5 ranks according to the following criteria.

Difference of transmittance ΔT=Td(transmittance after the high temperature-high humidity treatment)−T0 (transmittance before the high temperature-high humidity treatment)

A: ΔT was less than 1%
B: ΔT was 1% or more but less than 5%.
C: ΔT was 5% or more but less than 10%.
D: ΔT was 10% or more but less than 15%.
E: ΔT was not less than 15%.

(Dimensional Variation of Polarizing Plate)

On each prepared polarizing plate, two markers (crosses) were drawn along the absorbing axis of the polarizer and the polarizing plate was treated at 80° C. under 90% RH for 120 hours. The distance between the two markers (crosses) was measured before and after the treatment using an optical microscope. Evaluation was carried in 5 ranks according to the following criteria.

Rate of change(%)=[(a1−a2)/a1]×100 a1: the distance before the treatment
a2: the distance after the treatment
A: The rate of change was less than 0.1%
B: The rate of change was 0.1% or more but less than 0.5%
C: The rate of change was 0.5% or more but less than 1.0%
D: The rate of change was 1.0% or more but less than 1.5%
E: The rate of change was 1.5% or more but less than 2.0%
F: The rate of change was 2.0% or more but less than 3.0%
G: The rate of change was 3.0%-5.0% or more (Viewing Angle Variation)
(Preparation of Liquid Crystal Display)

A crystal liquid panel for measuring the viewing angle was prepared as follows and the properties thereof were evaluated.

The polarizing plate previously pasted on the front side (or the viewer side) of a 32-type display W32-L7000, manufactured by Hitachi Seisakusho Co., Ltd., was peeled off and each of Polarizing plates 1-34 was pasted onto the glass surface of the liquid crystal cell. The polarizing plate was pasted so that the absorbing axis of the polarizing plate lay in the same direction as the absorbing axis direction of the previously pasted polarizing plate. Thus Liquid Crystal Displays 1-34 and 36-39 were prepared.

Regarding Polarizing plate 35, Liquid Crystal Display 35 was prepared by pasting the polarizing plate so that the cellulose ester film of the present invention faced the liquid crystal cell and the absorbing axis of the polarizing plate lay in the same direction as the absorbing axis direction of the previously pasted polarizing plate.

The Liquid Crystal Displays 1 through 39 prepared as above were subjected to the following evaluation.

The viewing angle of each of the liquid crystal displays was measured by EZ-Contrast 160D, manufactured by ELDIM Co., Ltd., in an environment of 23° C. and 35% RH. After that, the polarizing plates were treated for 500 hours at 60° C. and 90% RH, and the viewing angle of each of the liquid crystal displays was measured in the same manner as above. Further, the polarizing plates were treated for 1,000 hours at at 60° C. and 90% RH, and the viewing angles thereof were measured in the same manner as above. The evaluation was carried out in four ranks according to the following criteria.

A: No variation in the viewing angle was observed.
B: Variation in the viewing angle was slightly observed.
C: Variation in the viewing angle was observed.
D: Considerable variation in the viewing angle was observed.

(CM (Corner Unevenness))

Liquid Crystal Displays 1-39 were prepared by pasting the polarizing plate in the same manner as described in the evaluation of viewing angle variation. Liquid Crystal Displays 1-39 were treated for 300 hours at 60° C. and then the condition was restored to 23° C. and 55% RH. Power switch was turned on for lighting the backlight and a black image was displayed. After 2 hours of that, the light leaking through the black image was visually observed and evaluated according to the following norms.

A: No light leaking was observed at all.
B: Weak light leaking was observed at one or two points.
C: Strong light leaking was observed at one or two points.
D: Strong light leaking was observed at three or more points.

The above results were summarized in Table 6.

TABLE 6

| Polarizing plate No. | Polarizer Kind | Layer thickness (μm) | Polarizing plate Degradation | Dimensional variation | CM (Corner unevenness) | Viewing Angle Variation (500 h) | (1000 h) | Remarks |
|---|---|---|---|---|---|---|---|---|
| 1 | *1 | 20 | B | C | B | A | C | Inv. |
| 2 | *1 | 20 | B | C | B | A | C | Inv. |

TABLE 6-continued

| Polarizing plate No. | Polarizer Kind | Layer thickness (μm) | Degradation | Polarizing plate Dimensional variation | CM (Corner unevenness) | Viewing Angle Variation (500 h) | (1000 h) | Remarks |
|---|---|---|---|---|---|---|---|---|
| 3 | *1 | 25 | A | C | B | A | C | Inv. |
| 4 | *1 | 20 | A | C | B | A | C | Inv. |
| 5 | *1 | 20 | A | C | B | A | C | Inv. |
| 6 | *1 | 20 | A | C | B | A | C | Inv. |
| 7 | *1 | 20 | A | C | B | A | C | Inv. |
| 8 | *1 | 10 | A | C | B | A | C | Inv. |
| 9 | *1 | 5 | A | C | B | A | C | Inv. |
| 10 | *1 | 20 | A | C | B | A | C | Inv. |
| 11 | *1 | 20 | A | C | B | A | C | Inv. |
| 12 | *1 | 20 | A | C | B | A | C | Inv. |
| 13 | *1 | 20 | A | C | B | A | C | Inv. |
| 14 | *1 | 20 | A | C | B | A | C | Inv. |
| 15 | *1 | 20 | A | C | B | A | C | Inv. |
| 16 | *1 | 20 | A | A | B | A | A | Inv.. |
| 17 | *1 | 20 | A | A | B | A | A | Inv. |
| 18 | *1 | 20 | A | A | B | A | A | Inv. |
| 19 | *1 | 15 | A | A | B | A | A | Inv. |
| 20 | *1 | 10 | A | A | B | A | A | Inv. |
| 21 | *1 | 20 | A | A | B | A | A | Inv. |
| 22 | *1 | 5 | A | A | B | A | A | Inv. |
| 23 | *1 | 20 | A | A | B | A | A | Inv. |
| 24 | *1 | 20 | B | B | B | A | B | Inv. |
| 25 | *1 | 20 | B | B | B | A | B | Inv. |
| 26 | *1 | 25 | C | G | D | D | D | Comp. |
| 27 | *1 | 20 | C | G | D | D | D | Comp. |
| 28 | *1 | 20 | C | G | D | D | D | Comp. |
| 29 | *1 | 5 | D | E | D | D | D | Comp. |
| 30 | *1 | 20 | E | E | D | D | D | Comp. |
| 31 | *2 | 20 | B | D | B | B | C | Inv. |
| 32 | *2 | 20 | B | D | B | B | C | Inv. |
| 33 | *2 | 20 | B | B | B | A | B | Inv. |
| 34 | *2 | 25 | D | C | B | D | D | Comp. |
| 35 | *1 | 20 | A | C | B | A | C | Inv. |
| 36 | *1 | 20 | D | D | B | D | D | Comp. |
| 37 | *1 | 20 | C | E | B | C | D | Comp. |
| 38 | *1 | 20 | A | C | B | A | C | Inv. |
| 39 | *1 | 20 | A | C | B | A | C | Inv. |

*1: Polarizer 1, *2: Polarizer 2
Inv.: Inventive, Comp.: Comparative

It is understood from Table 6 that the cellulose ester film of the present invention is excellent in the dimensional stability, corner unevenness (light leakage) and flatness, and gives high retardation stability while humidity is varied, and the polarizing plate and the IPS mode display exhibit high viewing angle stability.

What is claimed is:

1. An in-plane switching mode display comprising a liquid crystal cell and a polarizing plate on at least a viewer side of the liquid crystal cell, the polarizing plate comprising a polarizer and a cellulose ester film on at least one of the surfaces of the polarizer, wherein
the cellulose ester film does not contain any compounds containing an aromatic ring and comprises a polyester represented by Formula (1) or a polyester represented by Formula (2),

$B_1$-(G-A-)$_m$G-$B_1$  Formula (1)

wherein $B_1$ represents a monocarboxylic acid having 1 to 12 carbon atoms, G represents a dihydric alcohol having 2 to 12 carbon atoms, A represents a dibasic acid having 2 to 12 carbon atoms, provided that none of $B_1$, G and A contains an aromatic ring, m represents a repeat number of 1 to 170, a plurality of $B_1$ may be the same or different, and a plurality of G may be the same or different;

$B_2$-(A-G-)$_n$A-$B_2$  Formula (2)

wherein $B_2$ represents a monoalcohol having 1 to 12 carbon atoms, G represents a dihydric alcohol having 2 to 12 carbon atoms, A represents a dibasic acid having 2 to 12 carbon atoms, provided that none of $B_2$, G and A contains an aromatic ring, n represents a repeat number of 1 to 170, a plurality of $B_2$ may be the same or different, and a plurality of G may be the same or different, wherein (i) an in-plane retardation value of the cellulose ester film (Ro) is 0 to 5 nm and a retardation value in a thickness direction of the cellulose ester film (Rt) is −20 to 10 nm, Ro and Rt are represented by the following formulas, respectively, $$Ro=(nx-ny)\times d$$

$$Rt=\{(nx+ny)/2-nz\}\times d$$

wherein d is thickness (nm) of the film, nx is the maximum in-plane refractive index of the film, ny is the in-plane refractive index of the film in the direction orthogonal to the axis direction having the maximum in-plane refraction index, and nz is the refractive index in the thickness direction of the film, and
Ro and Rt are values measured under a condition of 23° C. and 55% RH employing a 590 nm wavelength light;

(ii) a weight content of the polyester represented by Formula (1) or the polyester represented by Formula (2) is 2 to 30 weight % based on a weight of the cellulose ester;

(iii) a weight average molecular weight (mw) of the polyester represented by Formula (1) or the polyester represented by Formula (2) is not more than 20,000;

(iv) a thickness of the cellulose ester film is 20 to 80 μm; and (v) the polyester represented by Formula (1) or the polyester represented by Formula (2) has a function to lower retardation values Ro and Rt.

2. The in-plane switching mode display of claim 1, wherein the weight average molecular weight (Mw) of the polyester is not more than 10000.

3. The in-plane switching mode display of claim 1, wherein the cellulose ester film comprises an acyl group having 2 to 4 carbon atoms as a substituent; and the cellulose ester film meets the following conditions:

$$1.8 \leq SA \leq 2.6$$

$$0.1 \leq SP \leq 1.2$$

wherein SA represents an acetyl substitution degree and SP represents a propionyl substitution degree.

4. The in-plane switching mode display of claim 1, wherein the cellulose ester film comprises an acryl polymer.

5. The in-plane switching mode display of claim 4, wherein the acryl polymer comprises X and Y, X representing a monomer unit having a hydrophilic group and Y representing a monomer unit having no hydrophilic group; a molar ratio of X:Y is 1:1 to 1:99; and a weight content of the acryl polymer is 1 to 20 weight % base on a weight of a cellulose ester of the cellulose ester film.

6. The in-plane switching mode display of claim 1, wherein a thickness of the cellulose ester film is 20 to 60 μm.

7. The in-plane switching mode display of claim 1, wherein the polarizer contains an ethylenically modified polyvinyl alcohol; and a thickness of the polarizer is 5 to 20 μm.

8. A polarizing plate comprising a polarizer and a cellulose ester film on at least one of the surfaces of the polarizer, wherein the cellulose ester film does not contain any compounds containing an aromatic ring and comprises a polyester represented by Formula (1) or a polyester represented by Formula (2), $$B_1\text{-}(G\text{-}A\text{-})_m G\text{-}B_1 \qquad \text{Formula (1)}$$

wherein $B_1$ represents a monocarboxylic acid having 1 to 12 carbon atoms, G represents a dihydric alcohol having 2 to 12 carbon atoms, A represents a dibasic acid having 2 to 12 carbon atoms, provided that none of $B_1$, G and A contains an aromatic ring, m represents a repeat number of 1 to 170, a plurality of $B_1$ may be the same or different, and a plurality of G may be the same or different;

$$B_2\text{-}(A\text{-}G\text{-})_n A\text{-}B_2 \qquad \text{Formula (2)}$$

wherein $B_2$ represents a monoalcohol having 1 to 12 carbon atoms, G represents a dihydric alcohol having 2 to 12 carbon atoms, A represents a dibasic acid having 2 to 12 carbon atoms, provided that none of $B_2$, G and A contains an aromatic ring, n represents a repeat number of 1 to 170, a plurality of $B_2$ may be the same or different, and a plurality of G may be the same or different, wherein (i) an in-plane retardation value of the cellulose ester film (Ro) is 0 to 5 nm and a retardation value in a thickness direction of the cellulose ester film (Rt) is −20 to 10 nm, Ro and Rt are represented by the following formulas, respectively, $$Ro = (nx - ny) \times d$$

$$Rt = \{(nx + ny)/2 - nz\} \times d$$

wherein d is thickness (nm) of the film, nx is the maximum in-plane refractive index of the film, ny is the in-plane refractive index of the film in the direction orthogonal to the axis direction having the maximum in-plane refraction index, and nz is the refractive index in the thickness direction of the film, and Ro and Rt are values measured under a condition of 23° C. and 55% RH employing a 590 nm wavelength light;

(ii) a weight content of the polyester represented by Formula (1) or of the polyester represented by Formula (2) is 2 to 30 weight % based on a weight of the cellulose ester;

(iii) a weight average molecular weight (Mw) of the polyester represented by Formula (1) or the polyester represented by Formula (2) is not more than 20,000;

(iv) a thickness of the cellulose ester film is 20 to 80 μm; and (v) the polyester represented by Formula (1) or the polyester represented by Formula (2) has a function to lower retardation values Ro and Rt.

* * * * *